(12) United States Patent
Gressel et al.

(10) Patent No.: US 8,280,056 B2
(45) Date of Patent: Oct. 2, 2012

(54) SYSTEM AND METHODS FOR ENCRYPTION WITH AUTHENTICATION INTEGRITY

(75) Inventors: Carmi David Gressel, M.P. Negev (IL); Nicolas Tadeusz Courtois, Ipswich (GB); Gregory Van Bard, Hartsdale, NY (US); Avi Hecht, Nesher (IL); Ran Granot, Yavne (IL); Timothy James Salmon, Hitchin (GB); Itzhak Mintz, Kibbutz Dvir (IL)

(73) Assignee: Fortress Applications Ltd., Omer (IL)

( * ) Notice: Subject to any disclaimer, the term of this patent is extended or adjusted under 35 U.S.C. 154(b) by 0 days.

(21) Appl. No.: 13/143,172

(22) PCT Filed: Jan. 28, 2010

(86) PCT No.: PCT/IL2010/000075
§ 371 (c)(1),
(2), (4) Date: Jul. 1, 2011

(87) PCT Pub. No.: WO2010/086855
PCT Pub. Date: Aug. 5, 2010

(65) Prior Publication Data
US 2011/0286596 A1 Nov. 24, 2011

Related U.S. Application Data

(60) Provisional application No. 61/206,439, filed on Jan. 29, 2009, provisional application No. 61/214,856, filed on Apr. 30, 2009, provisional application No. 61/275,866, filed on Sep. 4, 2009.

(51) Int. Cl.
*H04K 1/00* (2006.01)
*H04L 9/00* (2006.01)
(52) U.S. Cl. .................... 380/268; 380/255; 380/258
(58) Field of Classification Search .................. None
See application file for complete search history.

(56) References Cited

U.S. PATENT DOCUMENTS
7,200,868 B2    4/2007    Mattox et al.
(Continued)

FOREIGN PATENT DOCUMENTS
WO    2007/063491    6/2007
(Continued)

OTHER PUBLICATIONS

Dixon, R.C., Spread Spectrum Systems, 2nd Edition, Wiley-Interscience Publication, New York, pp. 86-89, 1984.
(Continued)

*Primary Examiner* — David Y Jung
(74) *Attorney, Agent, or Firm* — Marsteller & Associates, P.C.

(57) ABSTRACT

A data integrity system including a transmitter, having a TX pseudorandom function generator, a TX switching function having a transmitting option and a TX combiner operative to receive, from a Host, an initialization data entity including at least one word, [TA1], in an initialization phase, to receive, during normal operation, two data entities of interest each including at least one data word of interest [TA2] and [TA3] respectively; to receive a first data entity including at least one word [TC1] comprising a randomized data entry, from the TX pseudorandom function generator, to generate a first XOR sum of the initialization data entity's word [TA1] and the at least one randomized data entity [TC1], in at least one iteration of an initialization phase; and, during normal operation, to generate and to output a second XOR sum [TA2⊕TC2=TB2] and a third XOR sum [TA3⊕TC3=TB3], wherein TB2 and TB3 are randomized data entities, wherein the words TA1, TA2 and TA3 are operative to initialize the data integrity system including enabling the data integrity system to encrypt the TA2 word and to generate an identifying hash value output using the TA3 word.

23 Claims, 18 Drawing Sheets

U.S. PATENT DOCUMENTS

| | | | |
|---|---|---|---|
| 7,398,398 B2 | 7/2008 | Ofek et al. | |
| 7,941,661 B2* | 5/2011 | Walmsley et al. | 380/259 |
| 2006/0120521 A1* | 6/2006 | Whitehead et al. | 380/46 |
| 2007/0244951 A1 | 10/2007 | Gressel et al. | |
| 2007/0291934 A1* | 12/2007 | Volkovs et al. | 380/28 |
| 2008/0258825 A1 | 10/2008 | Gressel et al. | |
| 2009/0217041 A1 | 8/2009 | Ramzan et al. | |

FOREIGN PATENT DOCUMENTS

| | | |
|---|---|---|
| WO | 2008/029406 | 3/2008 |

OTHER PUBLICATIONS

Simon, M.K., J. K. Omura et al, Spread Spectrum Communications Handbook, Revised Edition, McGraw-Hill, New York, pp. 396-399, 1985.

E. Biham & O. Dunkelman, A Framework for Iterative Hash Functions, NIST Hash Forum 2006, Santa Barbara, Aug. 2006.

C.S. Jutla, Encryption Modes with Almost Free Message Integrity, Journal of Cryptology, vol. 21, Springer-Verlag, Heidelberg, 2008.

A.J. Menezes, et al, Handbook of Applied Cryptography, hereinafter "Menezes" CRC Press, Boca Raton, 1997, pp. 228 229, 231, and 366.

Fortress GB, ZK-Crypt—Crypto Engines for a Long Secure Future, London, England.

Gressel C; Courtois N; Van Bard G; Hecht A; Granot R: "Understanding the ZK-Crypt—a Hash/Stream Cipher for (Almost) all Reasons", FortressGB Ltd., Jan. 23, 2009, pp. 1-33, (P002675843, Tavistock SQ., London.

Gressel C; Courtois N; Van Bard G; Hecht A; Granot R; Dunkelman O: "The A to Z Wide to the ZK-Crypt", FortressGB Ltd., Jan. 23, 2009, pp. 1-18, (P002675844, Tavistock SQ., London.

* cited by examiner

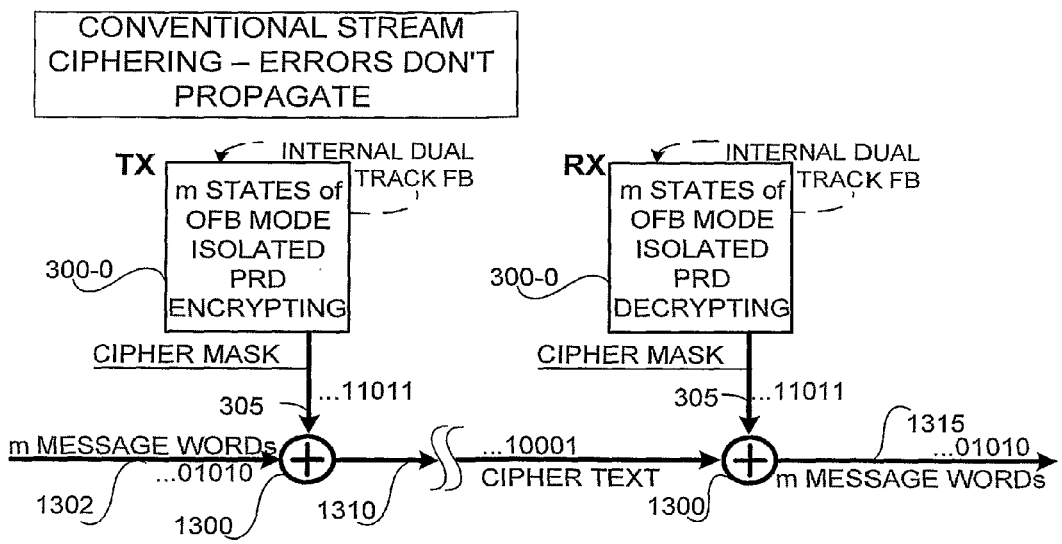
*Fig. 2B*  Ciphering Without Error Propagation
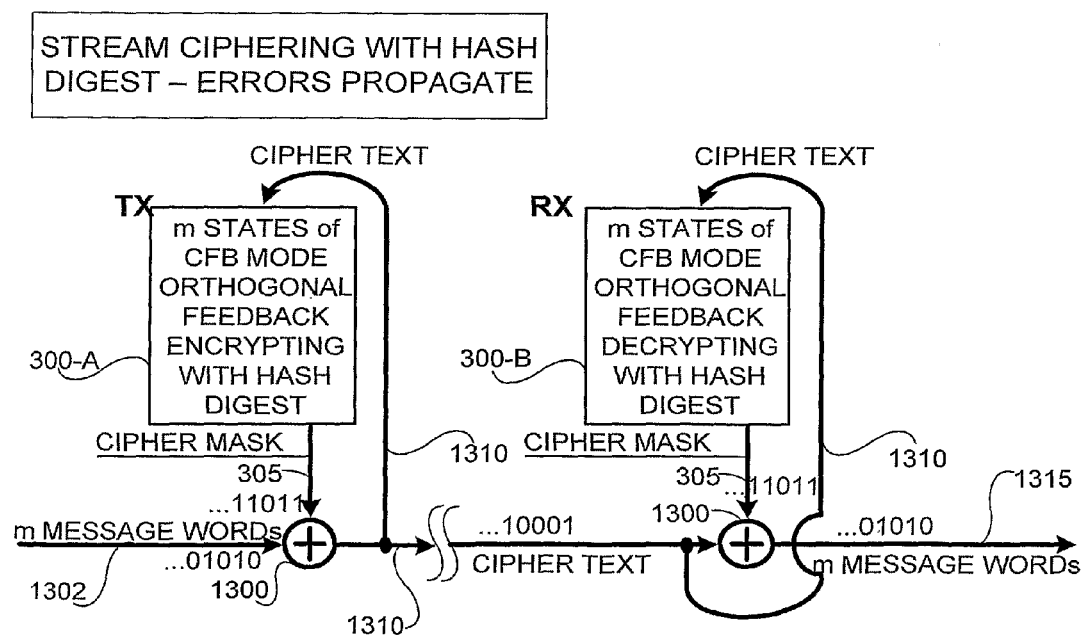
*Fig. 2C*

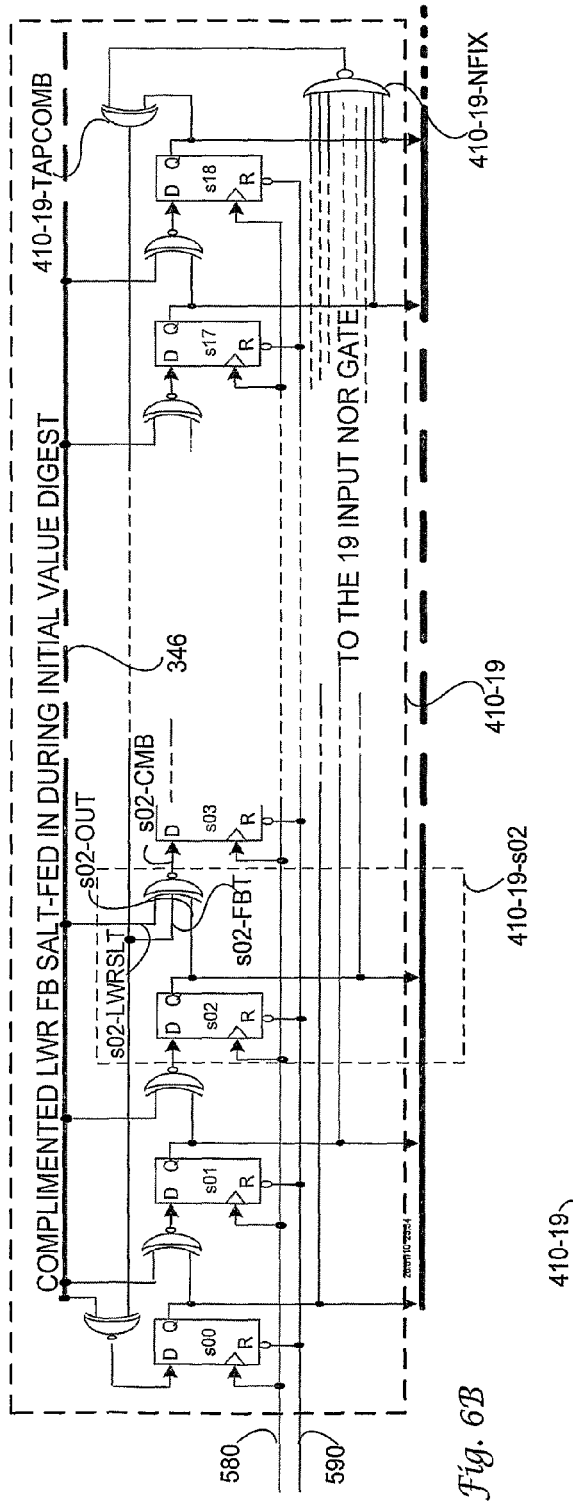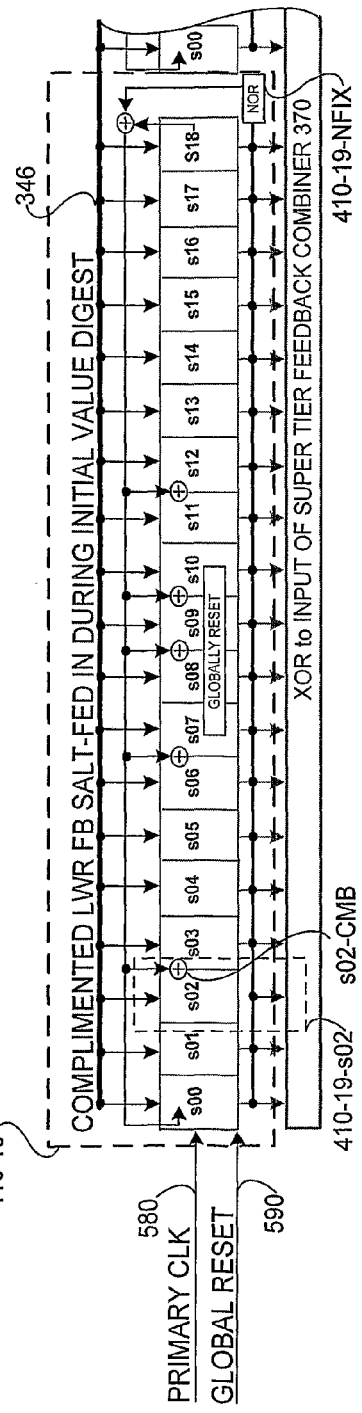
Fig. 6B
Fig. 6C

| | In TX what's input? | In TX what's output? | In RX what's input? | In RX what's output? |
|---|---|---|---|---|
| PRFG- Pseudo Random Function | TB1, TB2 & TB3 Initialization, and Normal Operation Output of TX Switching Function<br><br>Switch @A<br><br>All words are Unpredictable | TC1, TC2 & TC3<br><br>Except for 1st TC1 Initialization word-Global (Re)set PRFG Output-Data are Randomized TB1, TB2 & TB3)<br><br>All other words are unpredictable<br><br>Identical outputs in RX and TX, | Initialization RB1 = TB1; Shared Identical to TX Switch @B<br><br>Normal Operation Switch @B TB2 & TB3 Output of TX XOR Combiner and<br><br>into RX PRFG via Shunted RX Switch & into RX XOR Combiner | RC1, RC2 & RC3<br><br>Except for 1st TC1 Initialization word-Global (Re)set PRFG Output-Data are Randomized RB1, TB2 & TB3)<br><br>All other words are unpredictable<br><br>Identical outputs in RX and TX, |
| Switching Functionality | TB1, TB2 & TB3 to XOR combiner output – only<br><br>Switch @A | TB1, TB2 & TB3 Output to TX PRFG<br><br>Switch @A | Initialization RB1 = TB1; Shared & Identical to TX the output of the RX XOR combiner Switch @A<br><br>Normal Operation Switch @B TB2 & TB3 Shunted output from TX XOR combiner | Initialization RB1 to RX PRFG<br><br>Switch @A<br><br>Normal Operation TB2 & TB3 to RX PRFG<br><br>Switch @B |
| XOR Combiner | Initialization TA1 & TC1<br><br>Normal Operation Switch @A TA2 & TC2 TA2 = DOI 1 TA2 (Clear Text) & TC2<br><br>TA3 & TC3 TA3 = DOI 2 TA3 (Hash Generator Word- typically repeated x8) & TC3 | Initialization TB1 to TX PRFG Only<br><br>Normal Operation TB2 & TB3<br><br>TB2-Encrypted TA2 Cipher Text to TX PRFG & via Host to RX in<br><br>TB3-Encrypted TA3 Hash Generator Words = HV/Tag to TX PRFG & via Host to RX in | Initialization RA1 & RC1 Switch @A<br><br>Normal Operation Switch @B TB2 & RC2 Encrypted DOI 1= TB2-Cipher Text from TX XOR combiner & RC2<br><br>TB3 & RC3 Encrypted DOI 2-HV/Tag Words from TX XOR combiner typically repeated x 8 & TC3 | Initialization RB1 = TB1 to RX PRFG Only<br><br>Normal Operation TA2 & TA3<br><br>TA2 - DOI 1 Clear Text Output to Host only<br><br>TA3-DOI 2 Hash Generator Word to Host &/or to HV/Tag Authenticator |

*Fig. 10*

SYSTEM AND METHODS FOR ENCRYPTION WITH AUTHENTICATION INTEGRITY

REFERENCE TO CO-PENDING APPLICATIONS

Priority is claimed from:
a. US provisional application No. 61/206,439, entitled "A Counting Mechanism to Whiten Salt and Preclude Repetition of a Chaining Value", and filed Jan. 29, 2009.
b. US provisional application No. 61/214,856, entitled "Systems for Simultaneous Ciphering and Frame and/or Complete Message Authentication", and filed Apr. 30, 2009.
c. US provisional application No. 61/275,866, entitled "Encryption with Integrity with Automatic Hash Value Authentication Interrupt", and filed Sep. 4, 2009.

FIELD OF THE INVENTION

The present invention relates generally to computerized encryption and more particularly to hardware accelerated symmetric encryption and authentication.

BACKGROUND OF THE INVENTION

The following publications are believed to represent the relevant state of the art in transparent highly diffusive hardware accelerated symmetric encryption and authentication:

E. Biham & O. Dunkelman, A Framework for Iterative Hash Functions, NIST Hash Forum 2006, Santa Barbara, August, 2006; hereinafter "HAIFA"; describes a method which has been enhanced in certain devices to randomize orthogonal feedback, and to avert collisions in Hash and MAC generators.

C. S. Jutla, "Encryption Modes with Almost Free Message Integrity, Journal of Cryptology, Volume 21, Springer-Verlag, Heidelberg, 2008; hereinafter "Jutla"; describes a compression function, difficult to implement in hardware, which does not include seamless generation of Hash Value/Tags.

A. J. Menezes, et al, Handbook of Applied Cryptography, hereinafter "Menezes" CRC Press, Boca Raton, 1997, pages 228-229, 231, and 366; hereinafter "Menezes" describes cipher feedback mode of operation and alternate methods of Data Integrity using encryption and a MAC.

The disclosures of all publications and patent documents mentioned in the specification, and of the publications and patent documents cited therein directly or indirectly, are hereby incorporated by reference.

SUMMARY OF THE INVENTION

Certain embodiments of the present invention seek to provide strong symmetric cryptographic apparatus for securing transmitted and stored binary data where:

Co-pending US Application No. US 2008/0258825, describes a generic solution for generating orthogonal feedback to a hardware pseudo random number word oriented function, as used in certain embodiments; hereinafter "825";

Copending Provisional US Application No. 61/206,439 describes an apparatus based on Mersenne Prime Linear Feedback Registers for generating more than $2^{63}$ unpredictable whiteners for the two 32 bit orthogonal feedback streams of "825"; hereinafter "439";

Copending Provisional US Application No. 61/214,856 describes systems for simultaneous enciphering of frames of data and/or generating hash values; hereinafter "856";

Copending Provisional US Application No. 61/275,866 describes systems for simultaneous enciphering/deciphering of frames of data and/or generating and/or authenticating hash values for very long and very short messages, using one or more pseudo random word oriented functions; hereinafter "866"; and, US Application No. US 2007/0244951, describes the original ZK-Crypt Triple Function, Encryptor, Message Authentication Encoder architecture; hereinafter "951".

A compact low power multi permutation orthogonal result/feedback pseudo random device processor, PRD, is provided for accelerated initialization, single clocked word I/O for simultaneous, transparent, seamless exceptionally well diffused en/decryption, hash value generation and automatic hash value authentication. The basic function is an expansion function, wherein at every clocked cycle, the Result/Feedback processor uniquely encrypts, randomizes and expands the Message input into two orthogonal feedback words. The orthogonality processes of "825" assure that any combination of aberrations (one bit or more) in a Message Word linearly affects (flips bits in) interacting Tiers of the Register Bank in a first clocked feedback streams in different combinations; such that an attempt to reconcile (flip back in a following clocked Message Word) the aberration caused by one feedback stream may (provably) always add irreconcilable flips in a second affected tier. In "825" we proved that Messages cannot be modified meaningfully or otherwise.

Typically, an expansion function is provided, wherein at every clocked cycle, 32 bits of Message input are randomly diffused after 4 clock cycles into more than 415 binary state variable equations. The Chaining Value includes all binary state variables of the device, all of which are active in one of the multiplicity of permutations. There is no truncation process, as is typical in conventional hash processes.

The device supports an authenticated "advertising for service payment" option; e.g., a mobile phone operator may defer payment for transmitting SMS or voice message, if a user agrees to allow typically relevant promotional text on her mobile phone screen, or enabled in voice. Promotional text is included in the decrypted HV/Tag typically delimited by All '5' Words, $(5555\ 5555)_{16}$.

The innovative inclusion of the 64 bit Mersenne prime LFSR based HAIFA counter, which replaces a typical 32 bit binary HAIFA counter suggested by Biham and Dunkelman, into the Chaining Value of the expansion function device assures that an identical Chaining Value cannot occur twice in a Stream Cipher sequence, in a hash digest sequence or in a HV/Tag generating sequence. The binary output of the HAIFA Counter is typically unpredictable, as the counter's initial count value at the start of the En/Decrypt/Hash Digest is typically a random function of a key, the IV, and the number of Scramble Words.

Typically, following unique initialization, the originator's input is a seamless string including confidential data; and the receiver, following identical initialization, typically, seamlessly processes originator's output to receive a clear automatically authenticated version. Typically, all originator aka (also known as) TX, and receiver, aka RX, operations are single clocked step sequences; one word in, and one processed word out in each clock cycle. Sender and receiver typically use identical or equivalent cryptographic hardware engines, aka pseudo random device processors, PRDs. The potentially large public domain typically includes a multiplicity of users, and a multiplicity of vendors of the data module and system. Optional promotional and/or laudatory data is operable to generate an optional marketable decrypted Hash Value/Tag; e.g., "Serviced by Blue White"; "You've picked a winner call 800 4567 456"; following a decrypted message sequence.

Certain embodiments of the present invention relate to generic hardware cryptographic device solutions designed to achieve simultaneous encryption/decryption and hash value/tag authentication using extremely strong accelerated highly diffusive hardware pseudo random number function generators (the pseudo random device processors—PRDs—described herein), as embodied in the ZK-Crypt crypto hardware engine. The idea of "Encryption with Integrity", wherein encryption and authentication are integrated into a single operator was inspired by Moti Yung in "Jutla". A generic implementation was recently suggested in an article in the Journal of Cryptology, "Jutla". Jutla's implementation was based on multi-step block cipher based software. We suggest secure practical seamless accelerated solutions operable on arbitrary lengths of initialization, clear text and Hash Value/Tag, HV/Tag generator input data; with multi permutation, high diffusion, maximum length orthogonal feedback Chaining Values resulting in strong encryption and proven preclusion to Message Modification, and Chaining Value collisions.

We show advantages of a generic hardware stream cipher PRD based solution which follows criteria suggested by Yung in [and later, Eli Biham and On Dunkelman in "HAIFA". To enable single module (engine) encryption and hashing, we deemed it necessary to enhance the encryption of the two orthogonal feedback tracks in the Result/Feedback Processor of the ZK-Crypt module to preclude message modification and colliding occurrences of internal state variables. We veil revelations of the Cipher Mask in the dual feedback word stream of the Hash Digest which transpires simultaneously with the Stream Cipher encryption and decryption; typically allaying adversarial attempts to learn internal state variables (the Chaining Value) of the embodiment. Hash digesting, also termed herein "digesting", is the process of diffusing Message affected feedback into a PRD, such that each bit of the Message typically causes unique, typically large changes in the binary state flip flop variables, the Chaining Value, in a few clocked cycles.

Using "Menezes" nomenclature for Cipher Feedback, CFB, mode wherein a Running Key is equivalent to a Chaining Value, and to the status of all active binary states. Encryption with Integrity, in at least one embodiment is composed of three distinct processes, activated on a seamless stream of input words; as shown in FIG. 7, Examples C and D. The transitions from initialization to encryption and HV/Tag processes are seamless. Each of the processes is arbitrary length procedures; wherein length of security parameters is dependent on perceived necessary level of security.

A CFB Hash Digest Initialization Process for both originator and receiver, hereinafter TX and RX, wherein RX may be a decryptor/authenticator of stored cipher text from a communication, or read from Host memory:

$C_0 = E_{srv}(k_0 \| IV)$; FIG. 3A Switch 300 @ A; as shown in FIGS. 2A and 5A and 5B;

srv is the initial Running Key, the initial Chaining Value and initial set or reset flip-flop values of all state variables, following the Global (Re)Set of the PRD; the encoded output $C_0$ is not read, but is hash digested into RX and TX's PRD;

$k_0$ is the secret shared by sender and receiver;

IV is a known unique value which is typically extended by a padding Scramble;

$k_1 = HD(C_0)$; HD, the hash digest diffusion, is the multi permutation diffusion of the shared secret key and the IV into the PRD's state variables;

$k_1$ is the last Chaining Value of the Initialization Process and is therefore the initial Running Key for the following encryption/decryption and hash digest processes for both the Sender and Receiver.

At the end of Initialization, the PRDs are set for immediate encryption/decryption and/or for keyed Hash Digest (MAC). The Sender's Encryption Process, in CFB mode, as shown in FIGS. 2C and 5A; FIG. 3A Switch 300 @ A (for conventional Stream Cipher without error propagation; Switch 300 @ 0—no Hash Digest, Outback Feedback, OFB, FIG. 2B). In particular:

$C_1 = E_{k1,IV}(x)$; $C_1$ is the generated cipher text from the clear text data stream, x. $C_1$ is sent, with a minimum latency of one clock cycle, to RX, receiver's, PRD. In CFB mode, $C_1$ is fed back (hash digested) into the PRD via the included Result/Feedback Processor to generate $k_2$, the last Chaining Value of the encryption process (the initial Running Key of the next HV/Value generation process) for Encryption with Integrity only. Internal $k_2$ is typically unobservable and unpredictable to hardware TX and RX.

Optionally, in CFB mode, at agreed TX and RX locations, TX includes, (i.e., inserts), known "authenticating indicating words"; e.g., All '5' Words, into clear text, x; the words when decrypted and recognized by receiver present indication of intermediate authenticity of previously encrypted clear text.

Four last input x words, in CFB mode are typically padded with constants to maximize hash digest diffusion of the four last significant clear text words, e.g., All '5' Words, which may serve to delimit x; or, seen differently, these padded words augment the HV/Tag generation words, as all but the last cipher text 4 words are virtually fully diffused.

$k_2 = HD(C_1)$; HD, the hash digest function in CFB mode, is the multi permutation diffusion of TX generated encrypted clear text into RX PRD's state variables; $k_2$ is the last Chaining Value of the Sender's Encryption Process (and also the Receiver's Decryption Process) and is the initial Running Key for TX's HV/Tag Generation Process.

The Receiver's Decryption Process (assuming errorless receipt of $C_1$) in CFB mode; is shown in FIGS. 2C and 5B; FIG. 3A Switch 300 @B. In particular:

$C_2 = E_{k1}(C_1)$.

$C_2$ is the reconciled Clear Text, x, iff $C_1$ was received without error or aberration from TX (also in OFB mode, as shown in FIG. 2B).

Received $C_1$ is shunt-fed (hash digested) into Receiver's PRD (as was fed into TX's PRD) via the included Result/Feedback Processor to generate the last Chaining Value (the initial Running key of the HV/Tag generation process), $k_2$. Optionally, if sender has inserted known words at agreed locations in clear text, x; the words when decrypted by receiver, imply intermediate authenticity of previously encrypted clear text. Typically, RX detects the delimiters, which indicate end of x, and imply origin and validity of x.

$k_2 = HD(C_1)$.

HD, the hash digest, is the multi permutation diffusion of RX received encrypted clear text into RX PRD's state variables.

$k_2$ is the last Chaining Value of RX's Decryption Process and is the initial Running Key for RX's HV/Tag Generation Process and RX's Authentication Process.

In the Sender's HV/Tag Generation Process in CFB mode; as shown in FIGS. 2D and 5A:

$C_3 = E_{k2}(G)$; FIG. 3A Switch 300 @A;

The HV/Tag generator input, G, is an arbitrary length string of words, which, when extricated, indicates to RX the authenticity, origin, and proper reception of x.

$C_3$ is the generated HV/Tag, of arbitrary length, which is typically related to perceived level of necessary security. $C_3$ is sent to receiver device. $C_3$ is fed back (digested/diffused) into TX's PRD via the included Result/Feedback Processor. At least portions of G, are agreeable indication to RX of integrity of received x; e.g., the HV/Tag generation word sequence may comprise a stream of All '5' Words, $(5555\ 5555)_{16}$; where an agreed upon number of All '5' Words indicates integrity; and, in certain e.g. commercial applications, in a plurality of locations, unpredictable data are typically inserted in G delimited by an agreed number of All '5' Words.

The Receiver simultaneously generates shunts the HV/Tag and validate the HV/Tag in G; in FIG. 3A the Switch Function 300 is at station @B as shown in FIGS. 2D and 5B.

$C_3$ is TX's generated HV/Tag which is simultaneously decrypted and digested by RX. $C_4=E_{k2}(C_3)$; $C_4$ is output to the Text Store. C3 as received from TX is shunted via Switch station B and fed (digested/diffused) into RX's PRD via the included Result/Feedback Processor.

Iff the principal output of TX and RX's PRD are identical at every step; C4=G; G can be compared to the known G by the Host; or certain All '5' Words are detected and counted, and an authenticating interrupt automatically confirms authentication of the received cipher text and the required portion of the HV/Tag to a very high probability.

Certain embodiments of a hardware encrypting/decrypting result processor coupled to a PRD which typically seamlessly encrypts and generates or decrypts and generates and authenticates HV/Tags (HV/Tags are the generated reflection of a random input of data elements into an unpredictable word sequence). The all inclusive typical overhead is less than 50 clock cycles for an arbitrary length single data element processing session, For PRD speeds which may be close to DC and up to typical PRD speeds of hundreds of millions of 32 bit words per second; the apparatus typically processes and maintains an almost seamless uninterrupted stream of 32 (or 64) bit word encrypted or decrypted and authenticated data. Seamless, simultaneous hash digest and en/decryption and automatic HV/Tag authentication are innovations leading to low cost Information Technology security.

Both sender (TX or encryptor, and original Hash Value/Tag generator) and receiver (RX or decryptor and final HV/Tag authenticator), PRDs include equivalent synchronized cryptographic engines, whose internal state variables (the Chaining Values) when operationally in tact are all in identical states at each processing step. In many applications TX and RX can be the same PRD crypto-engine. E.g., in TX (originator, sender) mode an engine is typically operative to encrypt random data with authenticating HV/Tags to be saved in a Host's memory. The same engine, in the RX (receiver) mode, is operative to decrypt and automatically authenticate the TX generated cipher text with the appended Hash Value/Tag. For ease of understanding the general case, wherein a Host decrypts and/or authenticates data stored in Host's memory, we refer to the host as RX. As data stored in memory is typically data generated by a TX configuration, we typically refer to the sender or originator of the data, TX.

Following Initialization, TX's PRD engine outputs an encrypted message stream which is typically simultaneously hash digested into TX's same PRD; followed by an appended tail word sequence, a Hash Value/Tag. The TX originated data is transmitted, transferred or copied into a receiving processor, RX. TX originated data output stream is optionally processed by the data receiver, decryptor, authenticator, RX. RX's engine typically seamlessly decrypts and hash digests the message data and then typically simultaneously regenerates and recognizes TX's HV/Tag generating sequence. RX's Result/Feedback Processor may automatically or otherwise indicate to the Host the validity of the entire data transmission. Typically, RX's validation includes generation of a Cipher Mask sequence identical to TX's Cipher Mask sequence. TX's generated HV/Tag is an encryption of an agreeable to RX HV/Tag generating sequence; in one embodiment a sequence of All '5' Words, $(5555\ 5555)_{16}$. In other commercial environments, the HV/Tag generating sequence optionally includes laudatory commercial content. Iff RX's Cipher Mask sequence is identical to TX's Cipher Mask sequence; RX successfully decrypts TX's HV/Tag generating sequence.

Therefore, RX's validating (comparing) process decrypts and emits TX's HV/Tag Message generating input. In depicted embodiments, TX's HV/Tag generating input is a series of All '5' Words. RX typically simultaneously re-generates TX's Cipher Mask sequence, and XOR sums the TX Cipher Mask sequence to TX's alleged HV/Tag. The resulting XOR summed sequence is typically the decrypted TX HV/Tag generating sequence. In the depicted case, the All '5' Word sequence is decrypted and detected, and the number of decrypted All '5' Words is counted. RX's counter is typically set to transmit an interrupt to the RX Host indicative of authenticated clear text and origin.

It is anticipated that for a vendor's commercial advantage, TX's HV/Tag generating sequence may include a standard or specific data string; e.g., "Tonight's Theater Ticket". In certain embodiments, the commercial identifying tail may be preceded by a number of detectable All '5' Words, signifying end of file. In at least one embodiment which includes a defined number of All '5' Words, during, and following RX's replication of TX's Cipher Mask, RX's engine typically signals the Host of successful receipt and intrinsic integrity of the authenticated clear text received from a trusted source, over a reliable communication channel.

In a second embodiment, where RX knows the delimited section of data of interest, RX can load the hash generator data stream directly into the XOR combiner to encrypt the hash value; and with a delay of one clock, can stream compare TX and RX data streams.

In general, hash digesting encrypted clear text data into a PRD's state variables (aka Chaining Value) presents a strong deterrent to an adversary who may attempt to modify a Message Word, as the variables are only remotely related to the Message input sequence. We assume that an adversary typically has temporary unlimited access to a multiplicity of PRD's Message Word inputs and encrypted data output pairs. If the secret keys are uncolored random words, a brute force search of the secret keys is typically the most efficient adversarial attack for extricating a secret key.

In Encryption with Authentication Integrity, the Message input to the PRD is encrypted by the Cipher Mask, two Salts generated in the Data Churn section of the PRD, and by the appended pseudorandom 64 bit Mersenne prime based HAIFA counter, as shown in FIG. 1. The HAIFA Counter is unpredictably activated at the start of the Message sequence count, so that its initial count value is a one-way result of a pseudo random function of the initialization constants (the secret key and the typically non-secret unique IV, initial value). The HAIFA Message Count is a pseudorandom 64 bit feedback "whitener" sequence wherein to each Message Word is assigned a unique unrepeated random number. As the two feedback streams are uniquely, independently and unpredictably randomized by the HAIFA counter, their output typically precludes herding, wherein a fraudster adversely inserts a false portion of message, ending with a repeated Chaining Value, The Encryption with Authentication Integrity paradigm is generic for any suitable PRD wherein orthogonal feedback linearly aberrated by input Message Words massively diffuses into the PRDs, operative to generate Stream Cipher Masks operable to encrypt or decrypt.

For those instances wherein the communicating channel is susceptible to minor burst noise, and resulting errors typically are not previously corrected; we suggest a preliminary HV/Tag check routine on a frame transmission, prior to the next step of fault vulnerable decryption and hash digest. This strategy is typically most efficient where TX and RX systems each include two onboard PRD engines; with adaptable strong error correction capabilities, or with an efficient channel for resending faulty frames. As is shown in FIGS. 8A, 8B and 8C, final All Frame hashing of large data transmissions includes a check of integrity of each contiguous encrypted frame, prior to digest in the All Frame decryptor and authenticator.

By isolating the PRD from the data flow; the apparatus is configured as a cryptographically strong conventional stream cipher (without hash digest). Conventional stream ciphers are transmission fault resistant, as typically only flipped bits in noisy communication channels are affected, e.g., lone pixels in a TV transmission, and errors in general are not propagated, as in block ciphers where all state variables of the device are typically affected by single errors in the transmission. Predefined words in predefined locations; e.g., the All '5' word is repeated in the 512 to the 515'th TX Clear Text, when recognized by RX in Stream Cipher sequences, serve as indications that TX and RX systems are synchronized and protected by unique Secret Keys with unique Cipher Mask encrypting/decrypting sequences.

For those instances wherein the communicating channel is susceptible to minor burst noise, and immediate receipt of decrypted data is of typical prime importance; e.g., a voice stream which suffers occasional faulty Message bits; causing a pip of noise in the output; a user may choose a configuration based on a conventional fault resistant frame oriented stream cipher generator with a second tandem PRD engine receiving cipher text and generating HV/Tags on TX generated cipher text. Portions of data are termed herein "blocks", "pages", and "frames", interchangeably.

In this scheme, a faulty frame is optionally stored with the genuine TX generated Hash Value/Tag. Later, or immediately after receipt a faulty frame may be reconciled. A final All Frame Hash Value/Tag is typically generated by a Hash Digest on the sequence of TX's Frame HV/Tags. Other strategies are known to workers practiced in the art.

According to certain embodiments (not depicted) for systems with evenly dispersed Hash Value/Tags, used to delimit or to mark blocks of a long file, provisions to temporarily store a complete chaining value is desirable. A replica of the chaining value which follows a successful intermediate authentication sequence is stored in temporary memory, to be restored in the chaining value in the event that a next intermediate authentication fails to prove a valid last portion of errorless text. This would allow for repeated trials to reconcile the last data portion.

There is thus provided, in accordance with at least one embodiment of the present invention, a data integrity system including a transmitter, having a TX pseudorandom function generator, a TX switching function having a transmitting option and a TX combiner; the TX combiner being operative to receive, from a Host, an initialization data entity including at least one word, [TA1], in an initialization phase, to receive, during normal operation, two data entities of interest [DOI 1=TA2] and [DOI 2=TA3] each including at least one data word of interest, [TA2] and [TA3] respectively; to receive a first data entity including at least one word [TC1] comprising a randomized data entry, from the TX pseudorandom function generator, to generate a first XOR sum [TA1⊕TC1=TB1] of the initialization data entity's word [TA1] and the at least one randomized data entity [TC1], in at least one iteration of an initialization phase; and, during normal operation, to generate and to output a second XOR sum [TA2⊕TC2=TB2] and a third XOR sum [TA3⊕TC3=TB3], wherein TB2 and TB3 are randomized data entities, wherein the words TA1, TA2 and TA3 are operative to initialize the data integrity system including enabling the data integrity system to encrypt the TA2 word and to generate an identifying hash value output using the TA3 word.

Further in accordance with at least one embodiment of the present invention, the system also comprise a receiver, including an RX pseudorandom function generator which is functionally equivalent to the TX pseudorandom function generator, an RX switching function having both a transmitting option and a receiving option and an RX combiner.

Still further in accordance with at least one embodiment of the present invention, the second XOR sum includes an encoding of the data entities of interest [TA2] and [TA3] and two unpredictable data entities each comprising at least one data word [TC2] provided by the TX pseudorandom function generator.

Additionally in accordance with at least one embodiment of the present invention, the third XOR sum includes an encoding of the data entities of interest [TA2] and [TA3 ] and two unpredictable data entities each comprising at least one data word [TC3] provided by the TX pseudorandom function generator.

Further in accordance with at least one embodiment of the present invention, the TX switching function is operative to route the first, second and third XOR sums [TB1], [TB2] and [TB3] to serve as inputs to the TX pseudorandom function generator.

Still further in accordance with at least one embodiment of the present invention, the TX pseudorandom function generator is operative to receive the first, second and third XOR sums [TB1], [TB2] and [TB3] from the TX combiner, to generate the randomized data entities [TC1], [TC2] and [TC3] therefrom and to generate the randomized data entities to the TX combiner.

Further in accordance with at least one embodiment of the present invention, the randomized data entries [TC1], [TC2] and [TC3] are functions f0, f1 and f2 respectively of the XOR sums [TB1], [TB2] and [TB3] respectively.

Still further in accordance with at least one embodiment of the present invention, the functions f0, f1 and f2 each comprise an intractable randomizing function of at least one of the pseudorandom function generators operative to be affected by at least one of the XOR sums.

Further in accordance with at least one embodiment of the present invention, the RX switching function is operative to receive, from a Host, a data entity [RA1] shared with the transmitter such that [RA1=TA1] and wherein the data entity [RA1] is XOR summed to at least one word data entity [RC1] which is output from the RX pseudorandom function generator; and to route an output [RB1=RC1⊕RA1] of the combiner to the RX pseudorandom function generator during at least one iteration of the initialization phase.

Still further in accordance with at least one embodiment of the present invention, in a second, normal operation, phase, the RX switching function is operative to receive an output of the TX combiner including encoded data of interest TX XOR sums [TB2=TC2⊕TA2) and [TB3=TC3⊕TA3) and to route RX inputs [TB1] and [TB2] to the RX pseudorandom function generator.

Additionally in accordance with at least one embodiment of the present invention, TA2 comprises a DOI1 file including clear text and wherein the DOI1 File comprises at least one unpredictable word data entity including [TC2=ƒ1(TB1] from the TX pseudorandom function generator.

Still further in accordance with at least one embodiment of the present invention, TA3 comprises a DOI2 file including a Hash Generating Word repeated if data is more than 1 word in length, and wherein the DOI2 File comprises at least one unpredictable word data entity including [TC3=ƒ2(TB2] from the TX pseudorandom function generator.

Additionally in accordance with at least one embodiment of the present invention, the RX combiner is operative during the initialization phase to receive the initialization data entity [RA1=TA1] in at least one iteration of the initialization iteration phase.

Further in accordance with at least one embodiment of the present invention, the RX combiner is operative during normal operation to receive the at least one word encoded data entities [TB2] and [TB3], from the TX XOR combiner output.

Still further in accordance with at least one embodiment of the present invention, the shared first input data [RA1=TA1] is XOR summed to [RC1=ƒ1((RB1)] from the RX pseudorandom function generator and is not output to a Host Sampler.

Additionally in accordance with at least one embodiment of the present invention, the RX combiner is operative during normal operation to generate XOR sums of the two TX data outputs [TB2] and [TB3] with two RX unpredictable data entities from RX pseudorandom function generator [RC2] and [RC3] thereby to reconstruct data of interest.

Still further in accordance with at least one embodiment of the present invention, the data of interest includes [(TA2⊕((RC2=TC2)=TB3)⊕TB3=TA2=DOI 1=reconstructed clear text] and [(TA3⊕((RC3=TC3)=TB3)⊕TB3=TA3=DOI 2 the Hash Generation Word repeated at least once], thereby indicating the validity of DO 1 because (x⊕x=0 and x⊕0=x).

Additionally in accordance with at least one embodiment of the present invention, when in normal operation, the RX pseudorandom function generator is operative to receive the [TB2] data and [TB3] data directly via the RX switching function thereby to generate at least two unpredictable identical data entities [RC2=TC2] and [RC3=TC3] and thereby to continue maintenance of identical RX pseudorandom function generator and TX pseudorandom function generator binary state variables.

Still further in accordance with at least one embodiment of the present invention, the [TB2] data and [TB3] data are received simultaneously.

Further in accordance with at least one embodiment of the present invention, the words TA1, TA2 and TA3 are operative to initialize the data integrity system including enabling the data integrity system to simultaneously encrypt the TA2 word and generate an identifying hash value output using the TA3 word.

Still further in accordance with at least one embodiment of the present invention, the system also includes a population of data integrity systems each having a TA3 word and wherein each individual data integrity system's TA3 word is unique to the individual data integrity system.

Also provided, in accordance with at least one embodiment of the present invention, is a data integrity method including providing a transmitter, having a TX pseudorandom function generator, a TX switching function having a transmitting option and a TX combiner; using the TX combiner to receive, from a Host, an initialization data entity including at least one word, [TA1], in an initialization phase, to receive, during normal operation, two data entities of interest [DOI 1=TA2] and [DOI 2=TA3] each including at least one data word of interest, [TA2] and [TA3] respectively; to receive a first data entity including at least one word [TC1] comprising a randomized data entry, from the TX pseudorandom function generator, to generate a first XOR sum [TA1⊕TC1=TB1] of the initialization data entity's word [TA1] and the at least one randomized data entity [TC1], in at least one iteration of an initialization phase; and, during normal operation, to generate and to output a second XOR sum [TA2⊕TC2=TB2] and a third XOR sum [TA3⊕TC3=TB3], wherein TB2 and TB3 are randomized data entities, wherein the words TA1, TA2 and TA3 are operative to initialize the data integrity system including enabling the data integrity system to encrypt the TA2 word and to generate an identifying hash value output using the TA3 word.

Also provided, in accordance with at least one embodiment of the present invention, is a randomness enhancing method operative to enhance randomness of a pseudo random function computation system including a pseudo random function generator, the method comprising using at least one word length concatenation of at least two relatively prime length maximum length linear feedback shift register data words to output a unique pseudo random word count sequence; and combining the random word count sequence to at least one input to at least one pseudo random function computation system inputs thereby to add pseudo randomness to the pseudo random function generator.

Further in accordance with at least one embodiment of the present invention, the pseudo random function computation system comprises any of these systems shown and described herein.

Still further in accordance with at least one embodiment of the present invention, the count sequence is initialized to an unpredictable value prior to input of encoded data of interest input into at least one of the TX and RX pseudo random function generators in a second, normal phase of operation thereof.

Also provided is a computer program product, comprising a computer usable medium or computer readable storage medium, typically tangible, having a computer readable program code embodied therein; the computer readable program code adapted to be executed to implement any or all of the methods shown and described herein. It is appreciated that any or all of the computational steps shown and described herein may be computer-implemented. The operations in accordance with the teachings herein may be performed by a computer specially constructed for the desired purposes or by a general purpose computer specially configured for the desired purpose by a computer program stored in a computer readable storage medium.

Any suitable processor, display and input means may be used to process, display e.g. on a computer screen or other computer output device, store, and accept information such as information used by or generated by any of the methods and apparatus shown and described herein; the above processor, display and input means including computer programs, in accordance with some or all of the embodiments of the present invention. Any or all functionalities of the invention shown and described herein may be performed by a conventional personal computer processor, workstation or other programmable device or computer or electronic computing device, either general-purpose or specifically constructed, used for processing; a computer display screen and/or printer and/or speaker for displaying; machine-readable memory such as optical disks, CDROMs, magnetic-optical discs or other discs; RAMs, ROMs, EPROMs, EEPROMs, magnetic or optical or other cards, for storing, and keyboard or mouse for accepting. The term "process" as used above is intended to include any type of computation or manipulation or transformation of data represented as physical, e.g. electronic, phenomena which may occur or reside e.g. within registers and/or memories of a computer.

The above devices may communicate via any conventional wired or wireless digital communication means, e.g. via a wired or cellular telephone network or a computer network such as the Internet.

The apparatus of the present invention may include, according to certain embodiments of the invention, machine readable memory containing or otherwise storing a program of instructions which, when executed by the machine, implements some or all of the apparatus, methods, features and functionalities of the invention shown and described herein. Alternatively or in addition, the apparatus of the present invention may include, according to certain embodiments of the invention, a program as above which may be written in any conventional programming language, and optionally a machine for executing the program such as but not limited to a general purpose computer which may optionally be configured or activated in accordance with the teachings of the present invention. Any of the teachings incorporated herein may wherever suitable operate on signals representative of physical objects or substances.

The embodiments referred to above, and other embodiments, are described in detail in the next section.

Any trademark occurring in the text or drawings is the property of its owner and occurs herein merely to explain or illustrate one example of how an embodiment of the invention may be implemented.

Unless specifically stated otherwise, as apparent from the following discussions, it is appreciated that throughout the specification discussions, utilizing terms such as, "processing", "computing", "estimating", "selecting", "ranking", "grading", "calculating", "determining", "generating", "reassessing", "classifying", "generating", "producing", "stereo-matching", "registering", "detecting", "associating", "superimposing", "obtaining" or the like, refer to the action and/or processes of a computer or computing system, or processor or similar electronic computing device, that manipulate and/or transform data represented as physical, such as electronic, quantities within the computing system's registers and/or memories, into other data similarly represented as physical quantities within the computing system's memories, registers or other such information storage, transmission or display devices. The term "computer" should be broadly construed to cover any kind of electronic device with data processing capabilities, including, by way of non-limiting example, personal computers, servers, computing system, communication devices, processors (e.g. digital signal processor (DSP), microcontrollers, field programmable gate array (FPGA), application specific integrated circuit (ASIC), etc.) and other electronic computing devices.

The present invention may be described, merely for clarity, in terms of terminology specific to particular programming languages, operating systems, browsers, system versions, individual products, and the like. It will be appreciated that this terminology is intended to convey general principles of operation clearly and briefly, by way of example, and is not intended to limit the scope of the invention to any particular programming language, operating system, browser, system version, or individual product.

BRIEF DESCRIPTION OF THE DRAWINGS

For ease in understanding start with the generic configurations in FIGS. 2A-2D, then proceed to the generic devices in FIGS. 9A and 9B with data flow described in FIG. 10.

Certain embodiments of the present invention are illustrated in the following drawings:

FIG. 2B is a simplified depiction of the use of hardware pseudo-random devices processors, PRDs, of cryptographic strength similar to the above-described embodiment, for conventional stream ciphering. This is a block diagram of a version of the Output Feedback, OFB, mode implemented with internally generated double non-orthogonal feedback streams randomized with HAIFA Counting to preclude chaining value collision.

FIG. 2C is a simplified depiction of a CFB mode encryption/decryption implementation. Both of the Dual Track Orthogonal Feedback words are enhanced with random value HAIFA Counter chaining value collision preclusion. The initial Running Key is the chaining value set by the Initialization procedure.

The automatic test 320 and 322 of All '5' clear text words for validity is potentially useful (in addition to final hv/tag generation) for intermediate validating dispersed hv/tag words; e.g., as in validating structured/formatted messages, a sequence of more than one all '5' word in cipher or clear text is unlikely.

Figure 3A:
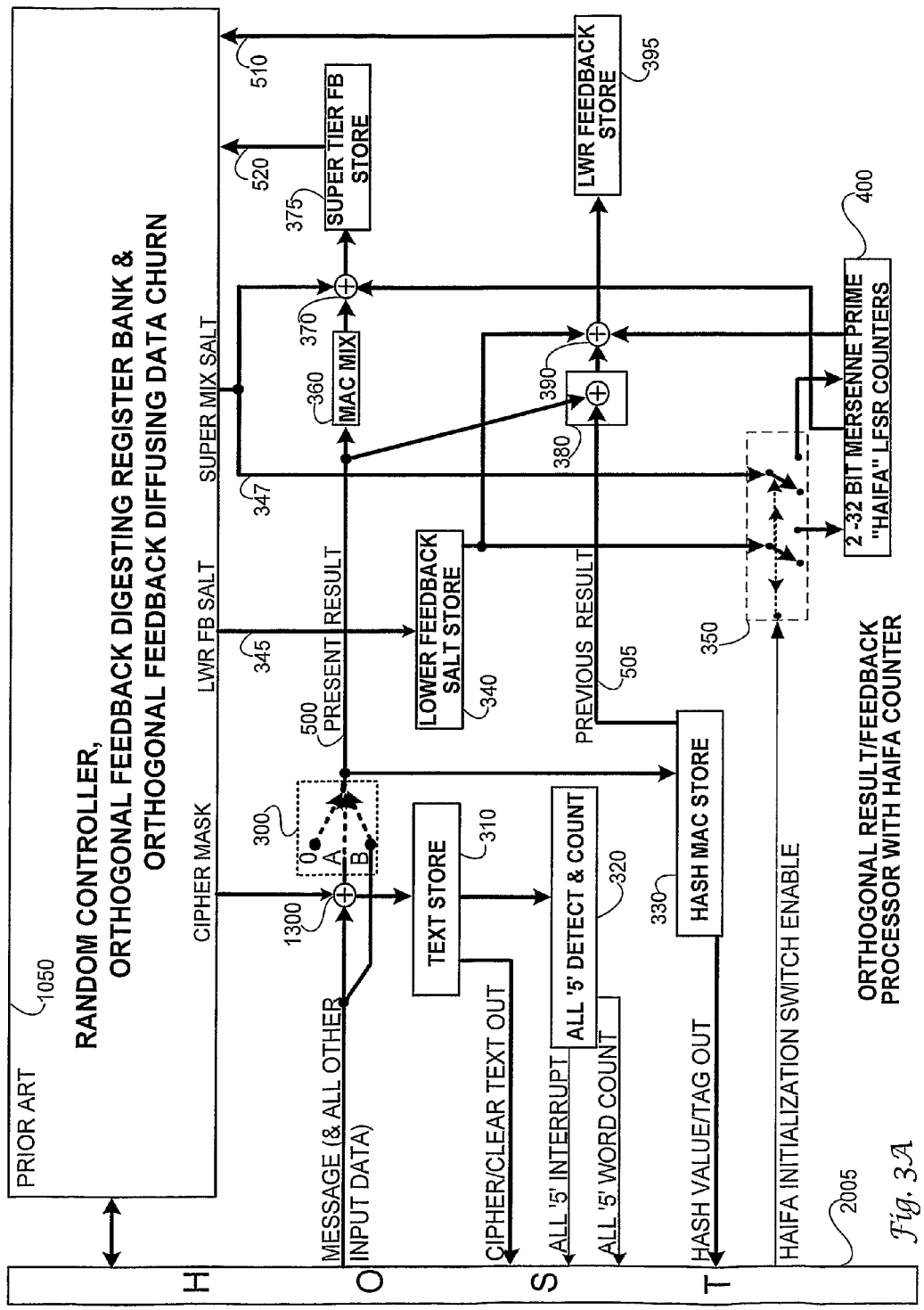
Figure 3B:
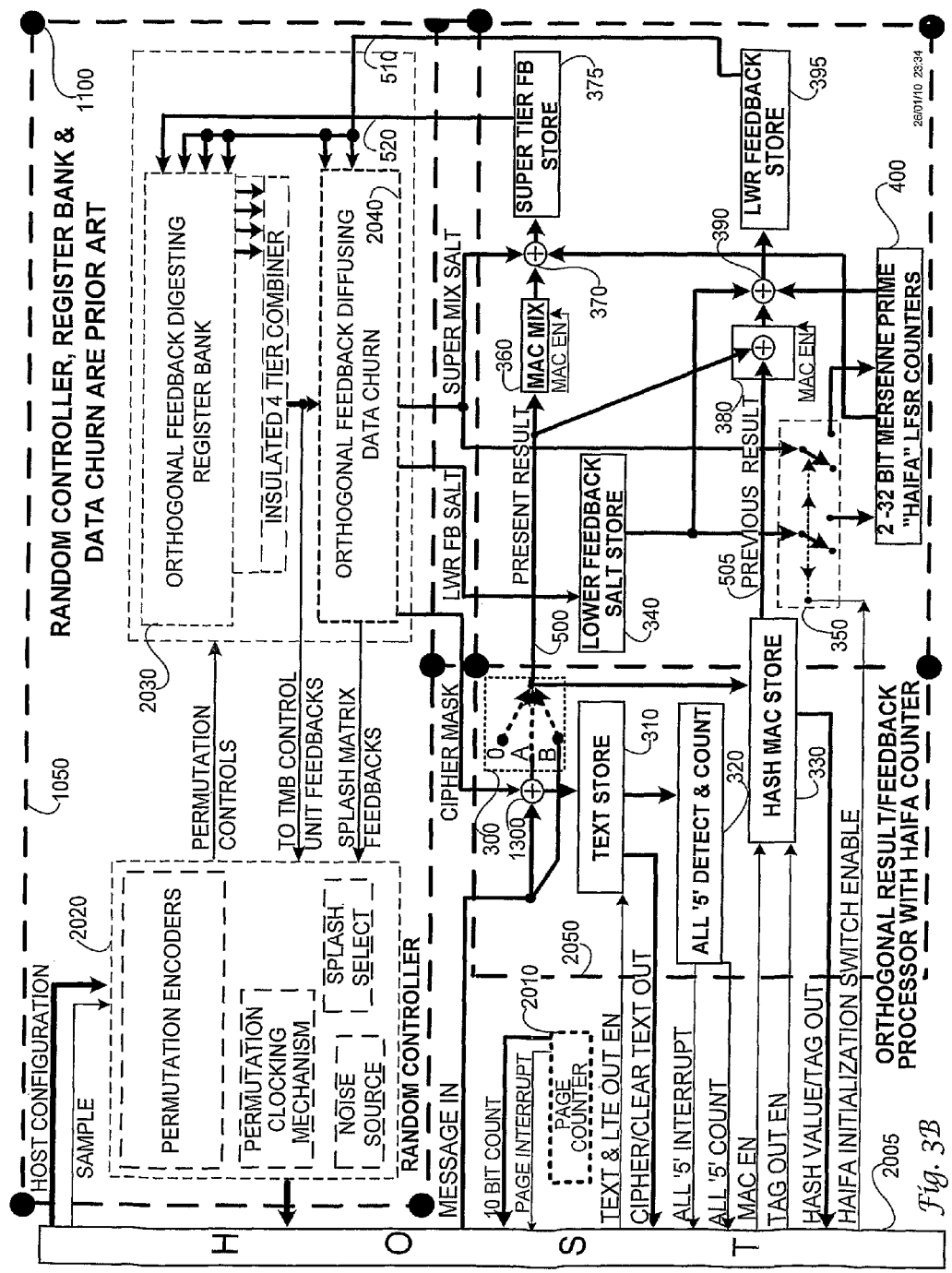

FIGS. 3A and 3B depict the blocks of embodiment circuitry of the Result/Feedback Processor; operative to perform Encryption with Integrity, conventional Stream Ciphering and HV/Tag generation. FIG. 3B includes the MAC enablers for CFB mode operation; the HAIFA Initialization Switch, which is operative to force internal salts to be combined to the initializing sequences of the HAIFA Counter; and the 0AB Switch which enables data flow in OFB and CFB mode operations.

Figure 4A:
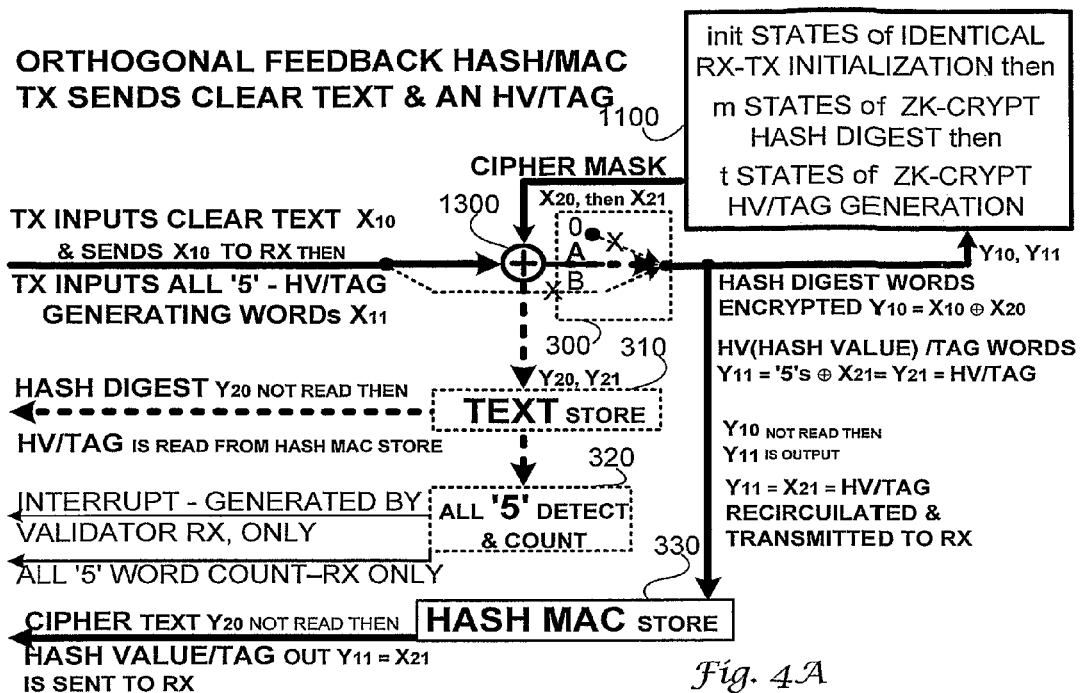
Figure 4B:
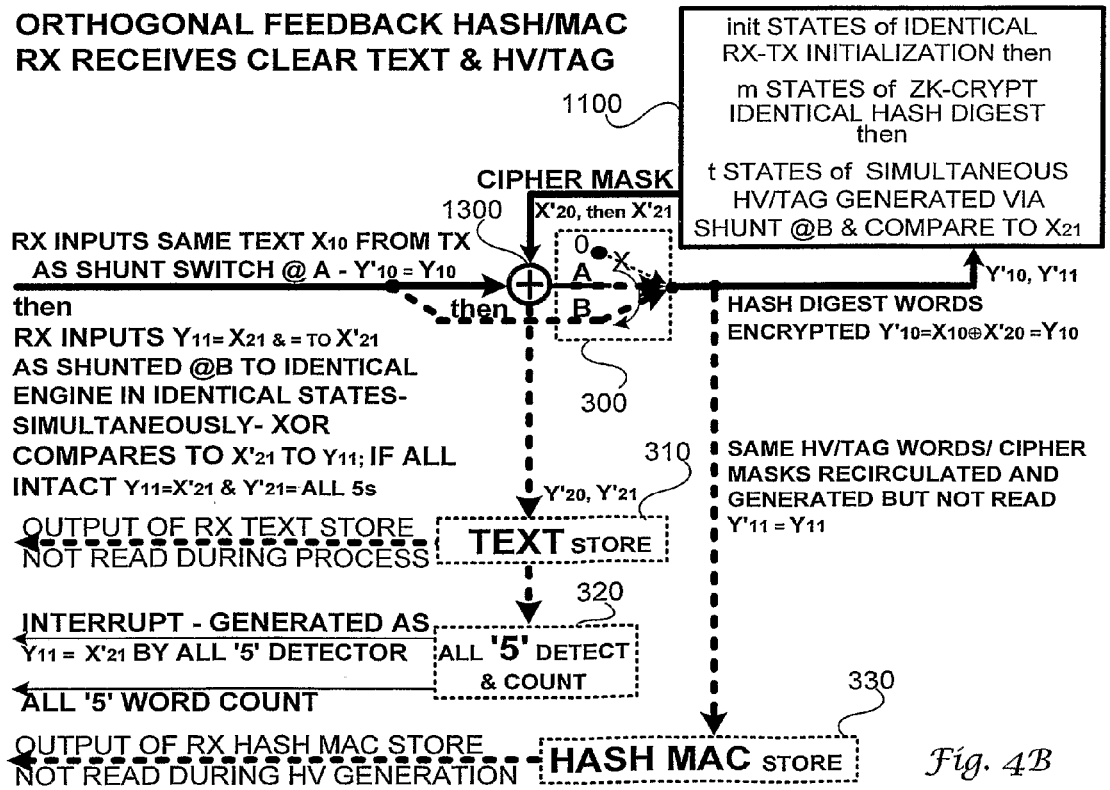

FIGS. 4A and 4B depict the conventional unkeyed hash process (and keyed hash; aka MAC—Message Authentication Code) process, wherein both TX and RX allegedly first input identical binary data to be Hash Digested.

Figure 5A:
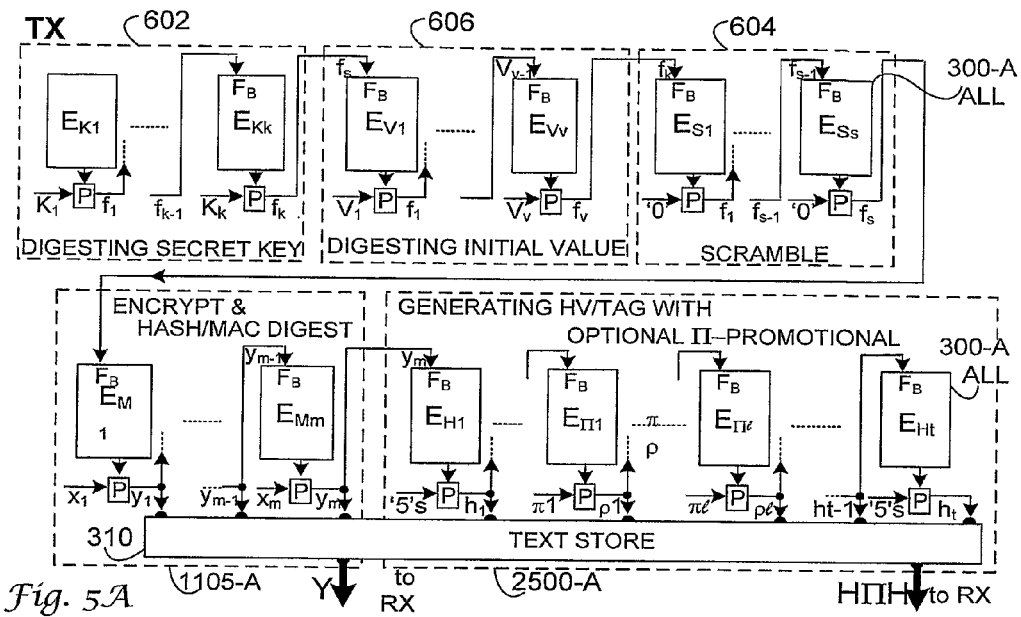
Figure 5B:
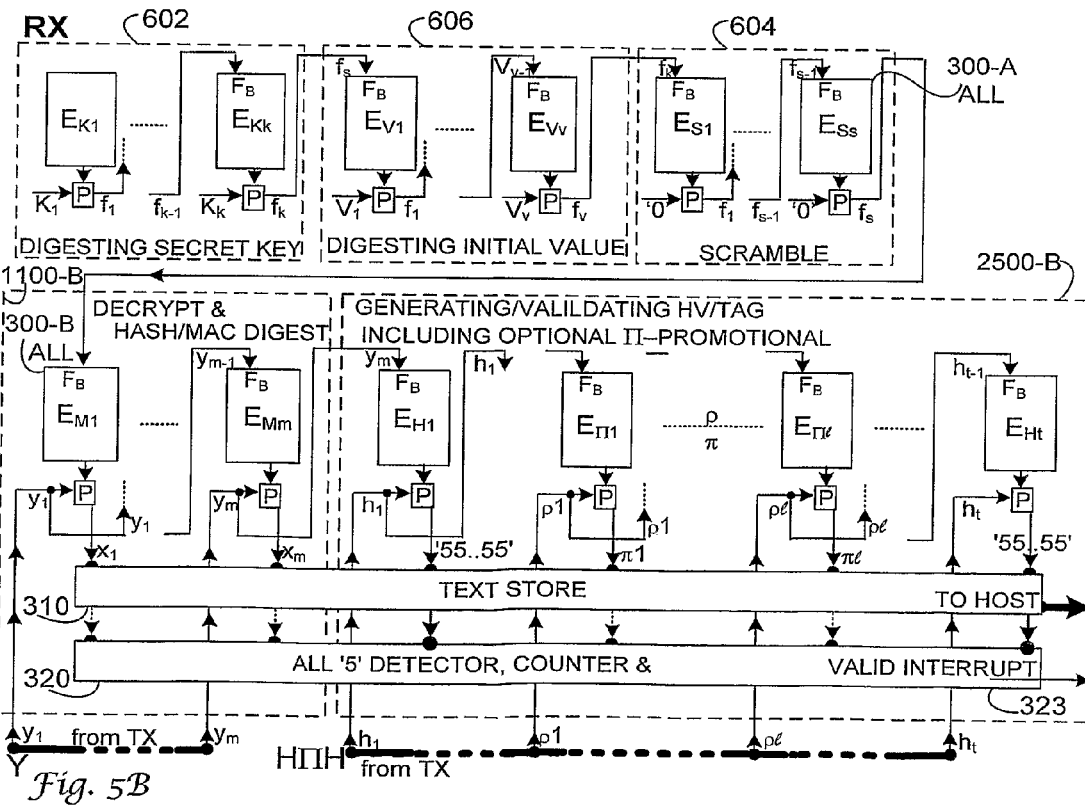

FIGS. 5A and 5B depict the status of TX and RX engines embodying the unique chaining value at the specific process step in the simultaneous Encryption with Authentic Integrity functions. Each block describes an engine condition, with an input, an output and a feedback into the PRD which affects the engine at the next Primary Clock cycle.

Figure 6A:
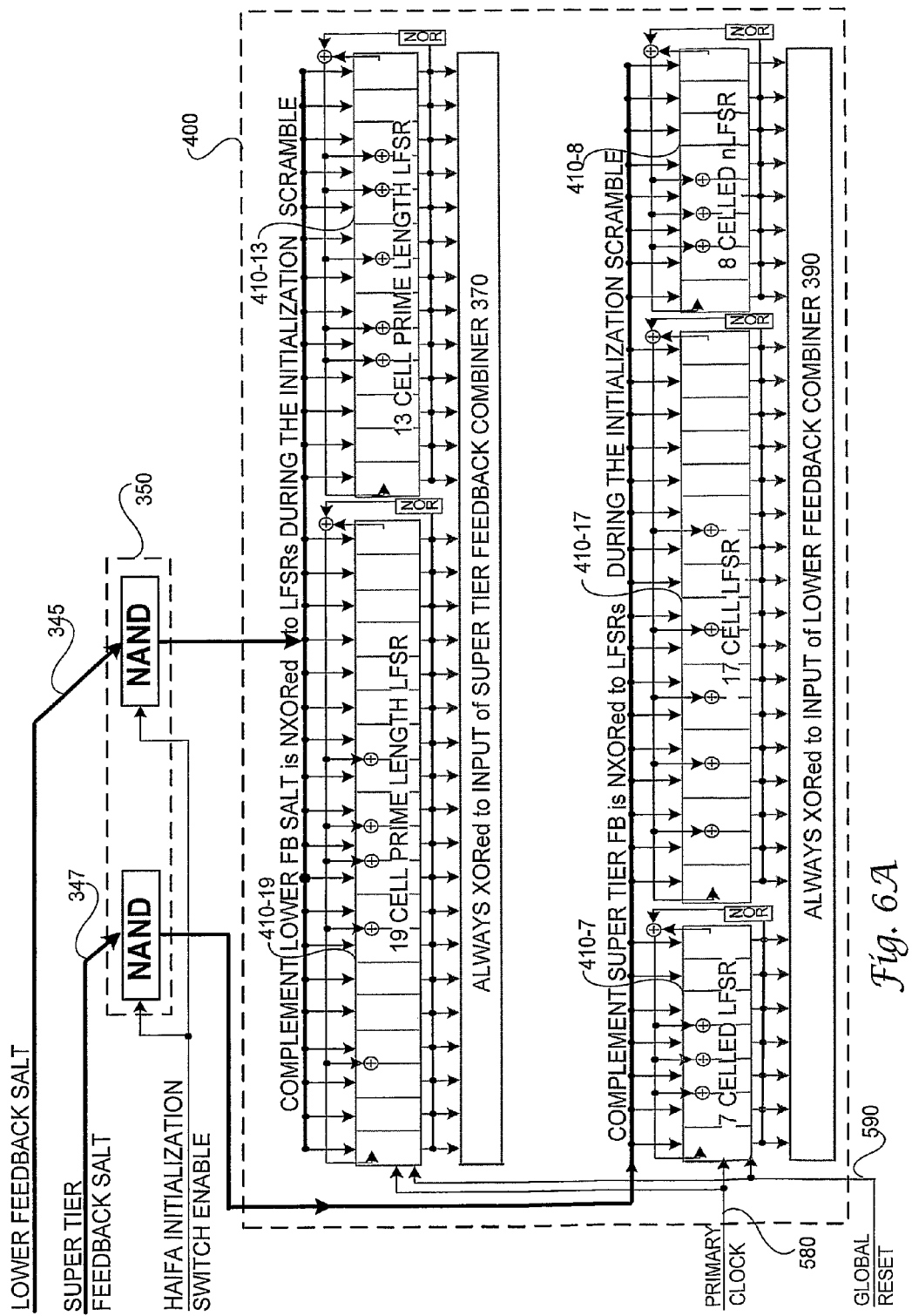

FIG. 6A depicts the Mersenne Prime LFSR based HAIFA Counter, which unpredictably whitens, encrypts and bestows a unique numerical value to each both the Lower and Super Tier feedback words. The Scramble is typically a pad on the IV. Typically, the HAIFA Counters are initialized by the Lower Feedback Salt and the Super Tier Feedback Salt. If full diffusion of the total IV sequence is considered a necessity, the Scramble sequence typically requires four clocks.

FIG. 6B depicts details parts of a prime length pseudo random 19 bit linear feedback generator; the basic elements of a typical HAIFA Mersenne Counter, the 19 bit LFSR Counter. FIG. 6C depicts the explicit feedbacks in the "one to many" LFSR of FIG. 6B.

Figure 7:
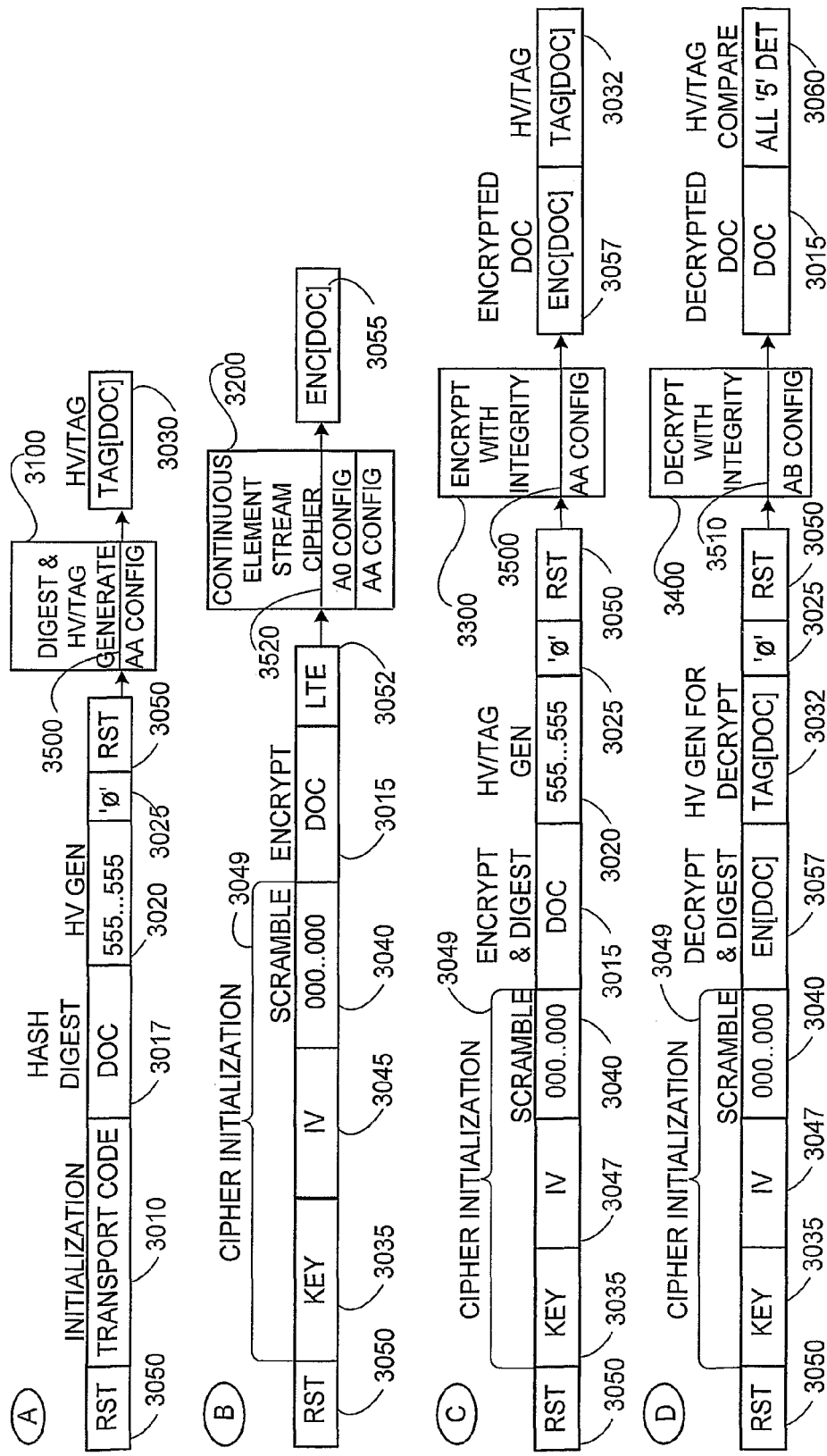

FIG. 7 depicts examples of the seamless data flow input and the relevant output of the four basic processes regulated by the Result/Feedback Processor.

Figure 8A:
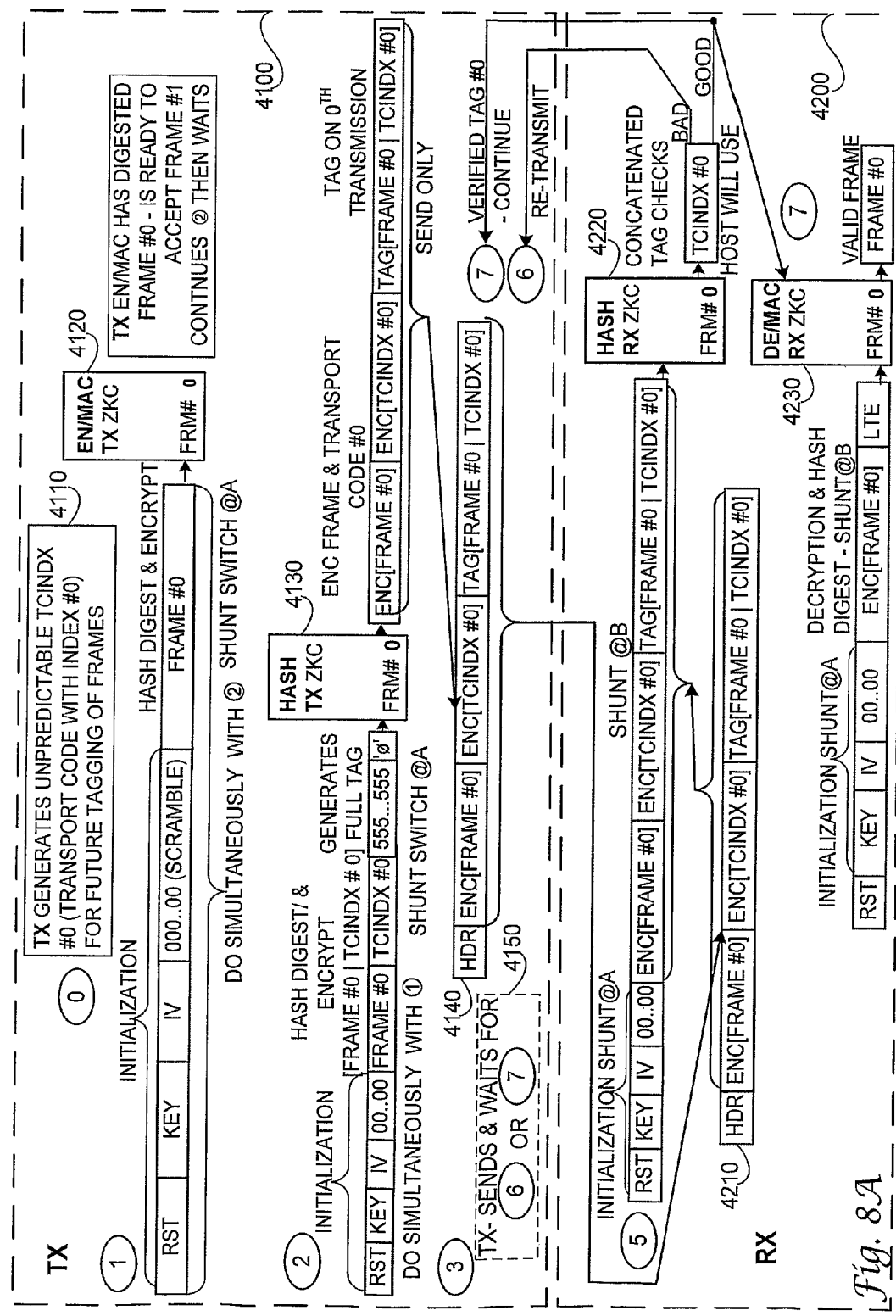
Figure 8B:
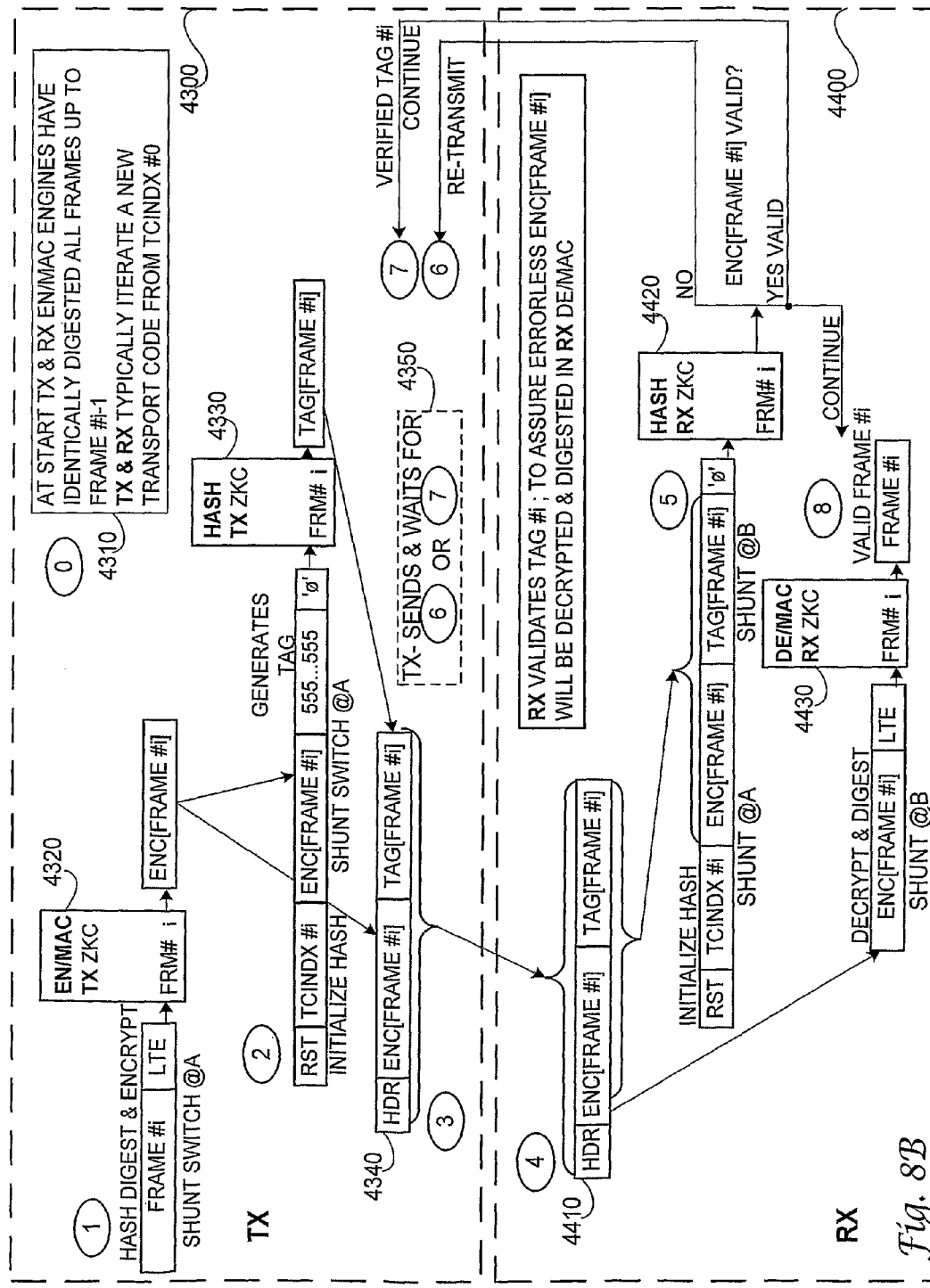
Figure 8C:
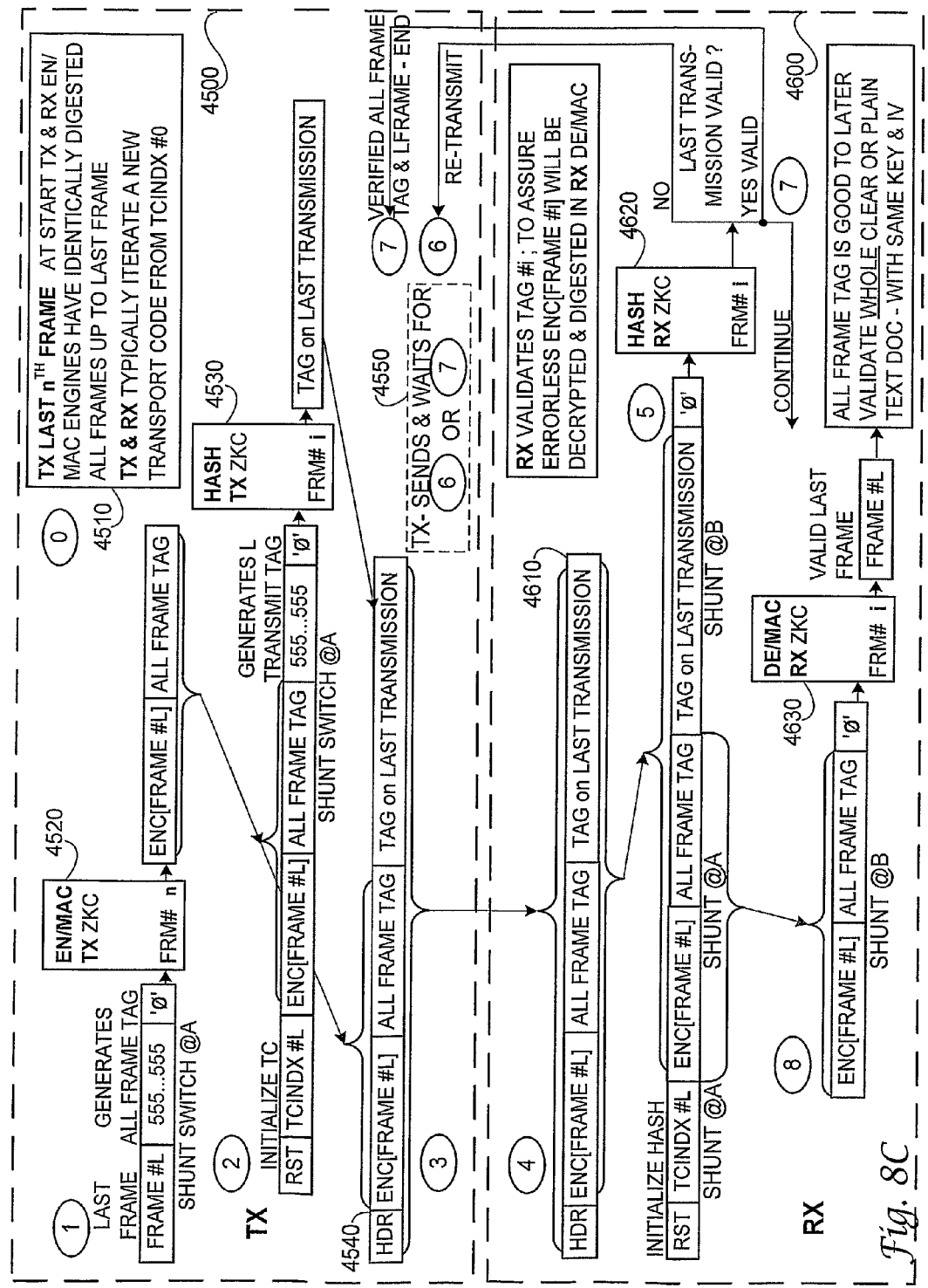

FIGS. 8A, 8B, and 8C are self explanatory descriptions of multi packet transmissions of encrypted and authenticated frames of binary data; as typically may be used for transmissions over open channels to be confidentially stored; e.g., in encrypted boots and procedural programs and data bases in allegedly reliable, but not secured memory.

Figure 9A:
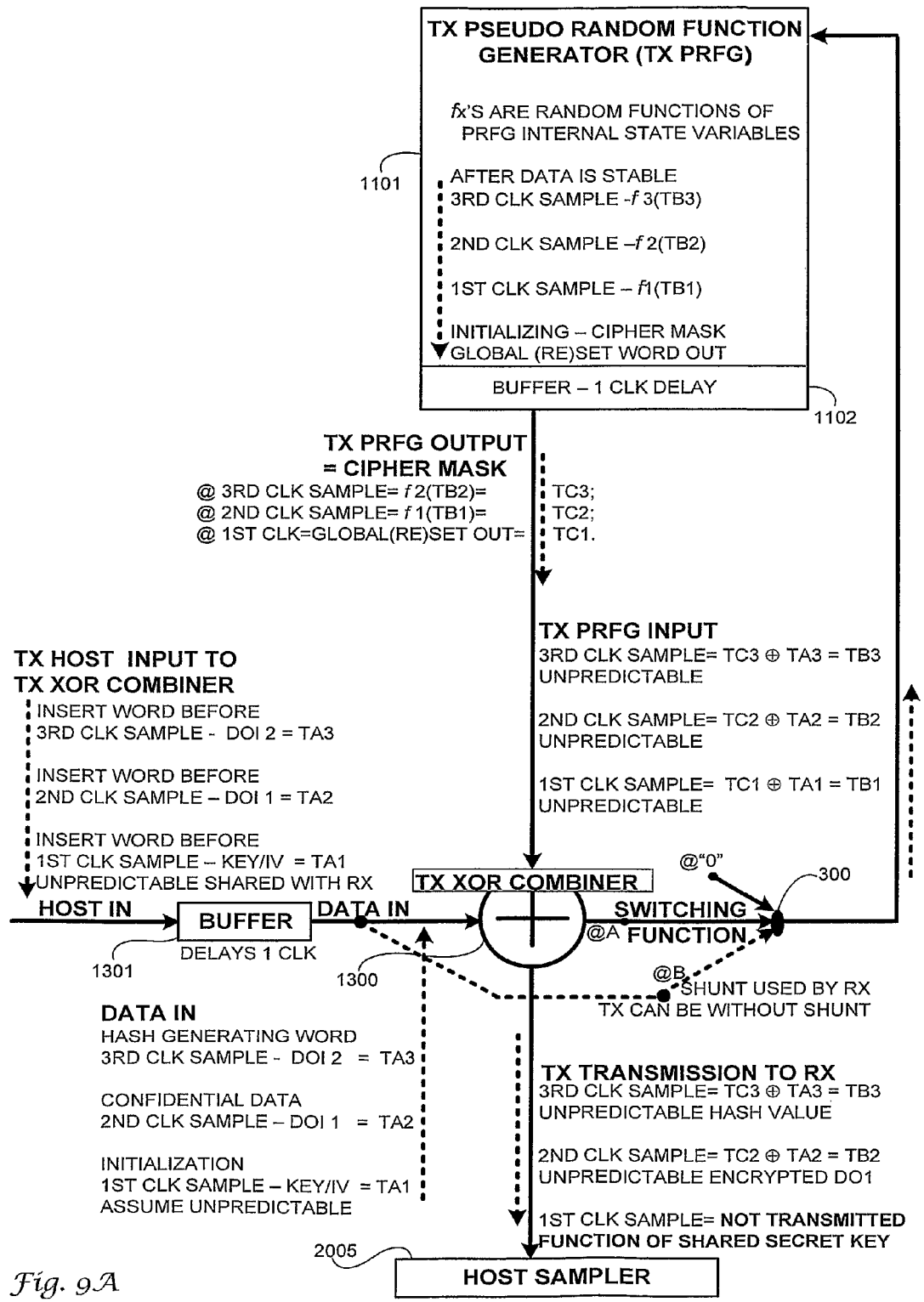
Figure 9B:
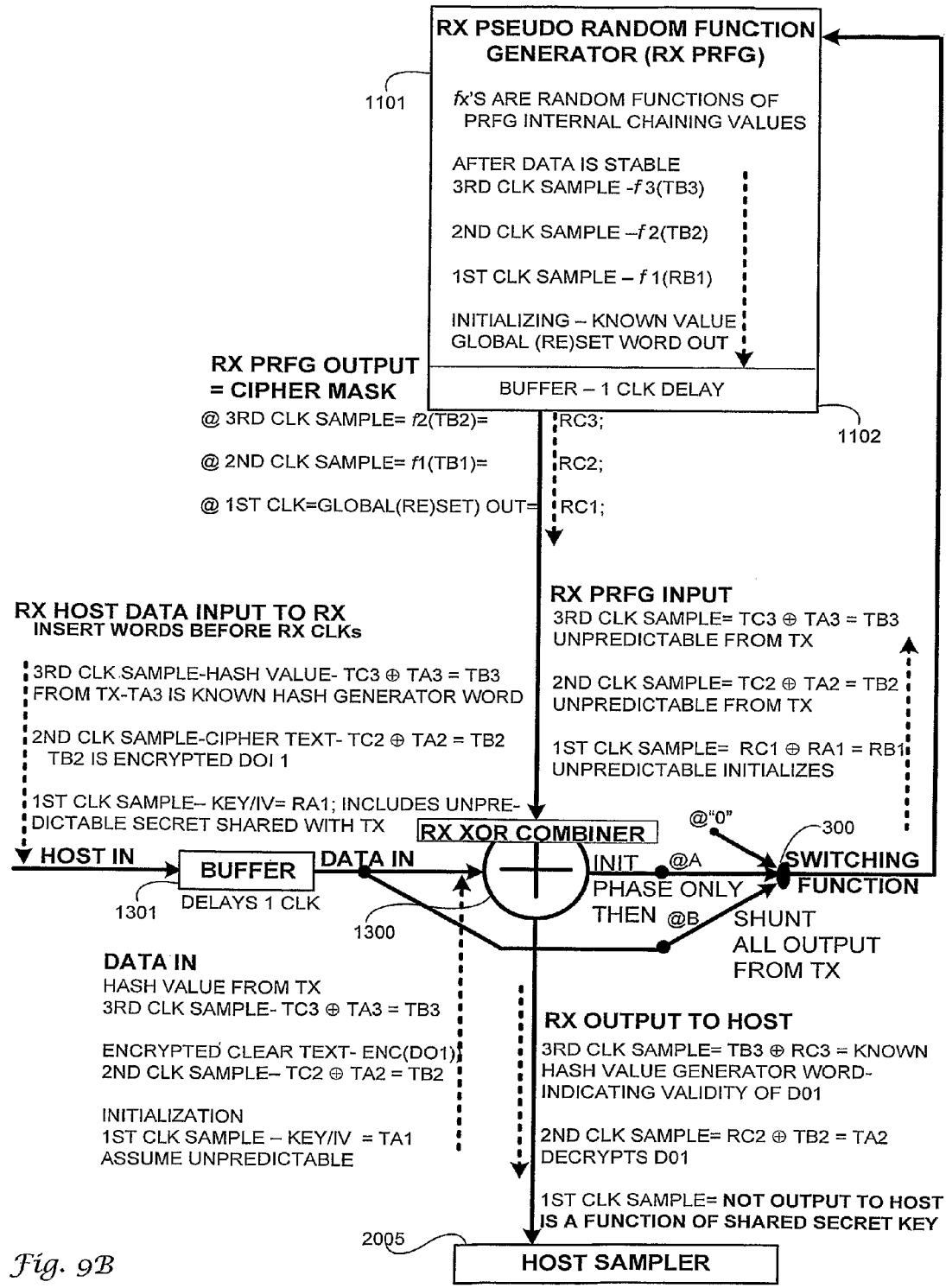

FIGS. 9A and 9B demonstrate generic data flow in an encryption with integrity system designed also to accommodate single word initialization, encryption and hash value generation and authentication. Methods shown for large single word initialization and authentication are shown.

FIG. 10 is a table of inputs and outputs of the pseudo-random function, switching function and XOR combiner components of each of a TX device and a corresponding Rx device, both constructed and operative in accordance with certain embodiments of the present invention.

Figure 11:
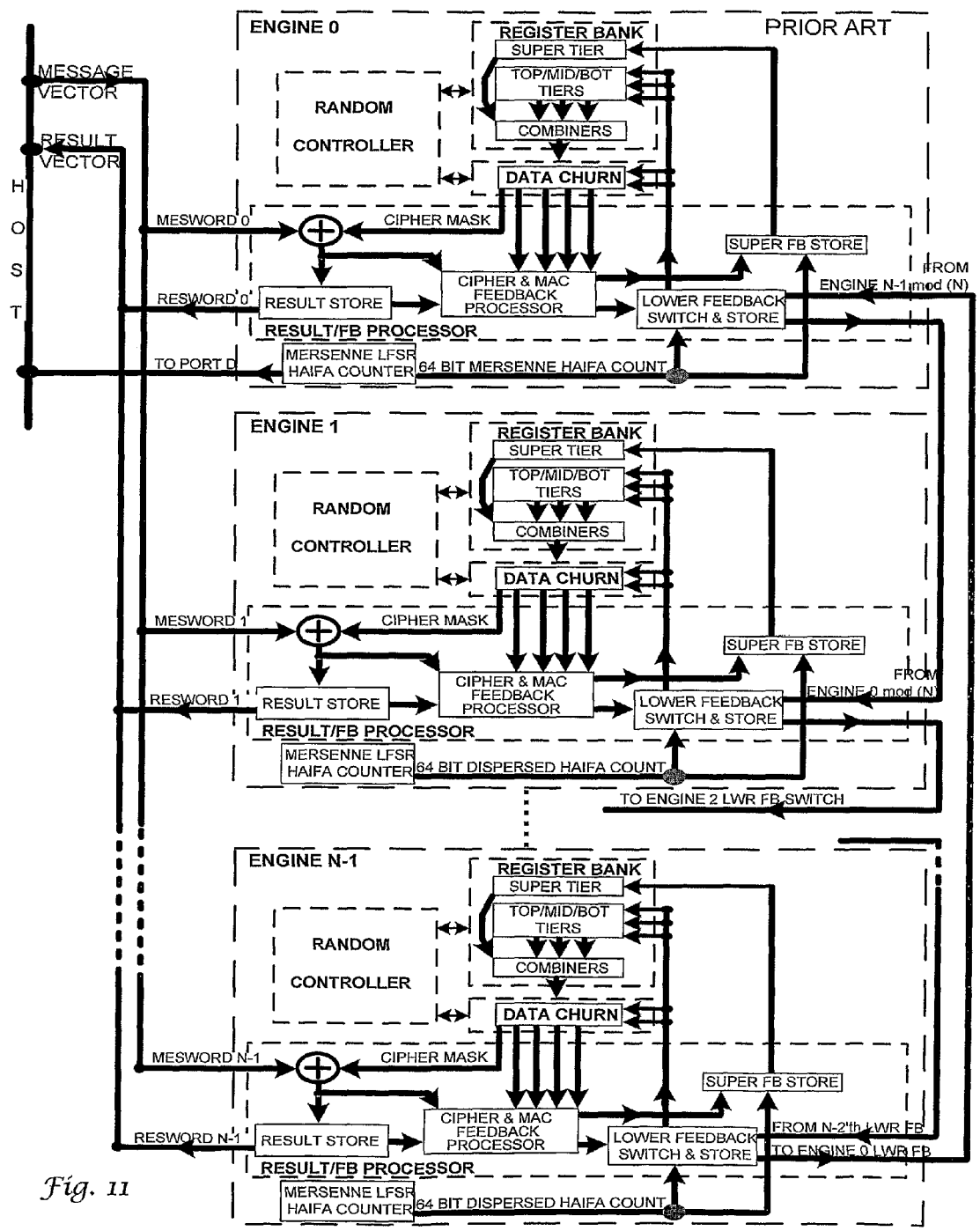

FIG. 11 is a prior art "825" configuration for generating long words.

DETAILED DESCRIPTION OF CERTAIN EMBODIMENTS

For ease in understanding start with the generic configurations in FIGS. 2A-2D, then proceed to the generic devices in FIGS. 9A and 9B with data flow described in FIG. 10.

Figure 1:
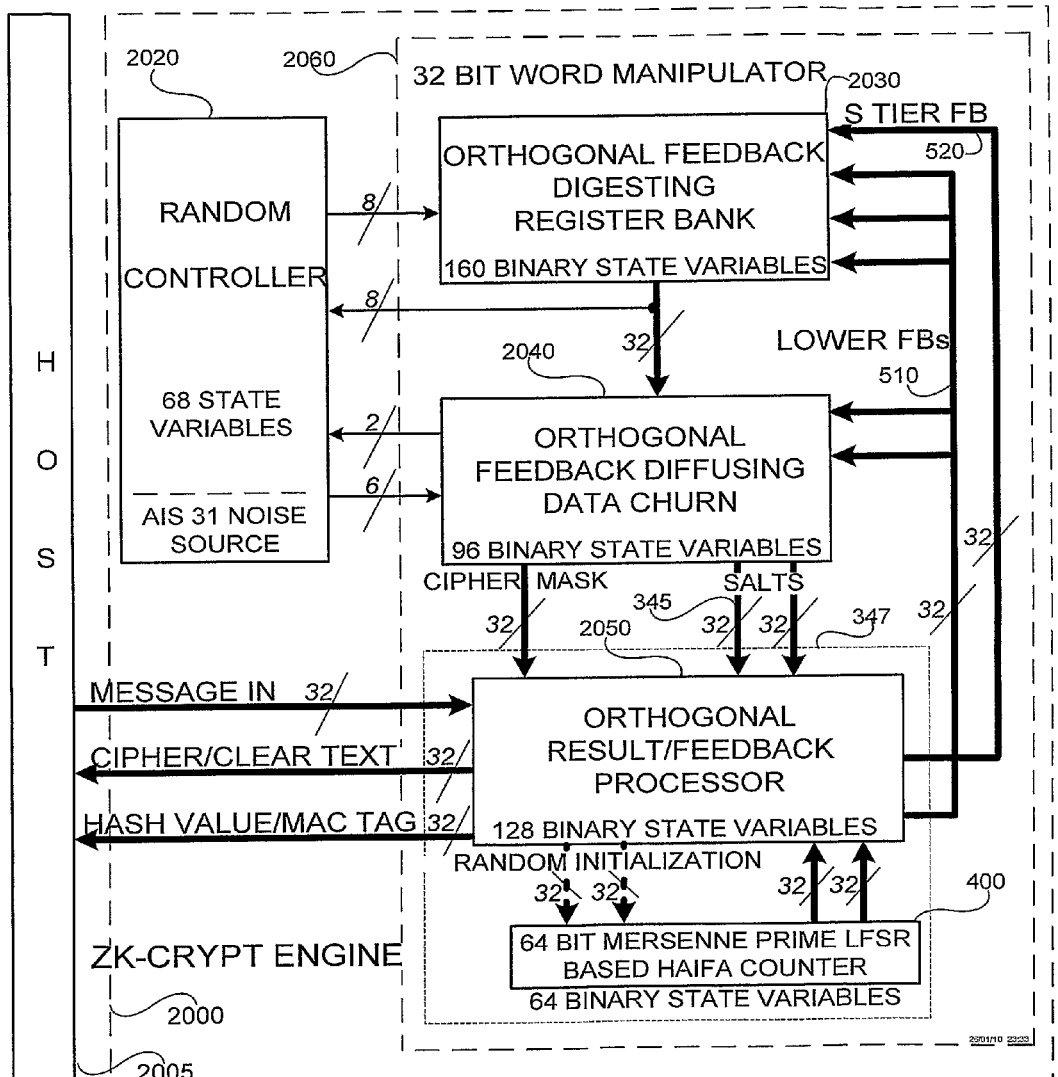
FIG. 1 is a simplified block diagram showing the ZK-Crypt multifunction PRD with elements of a symmetric encryption embodiment typically enhanced by the Result/Feedback Processor; supported by two randomized unique 32 bit Mersenne Prime Linear Feedback Shift Based HAIFA Counters.

Certain embodiments of the present invention are herein described, by example only, with reference to the accompanying drawings, wherein:

FIG. 1 is a simplified block diagram showing the ZK-Crypt multifunction PRD 2000, with elements of symmetric encryption apparatus 2060 enhanced by the Result/Feedback Processor 2050; supported by two randomized unique 32 bit Mersenne Prime Linear Feedback Shift Based HAIFA Counters 400. The pseudo random HAIFA Counter 400, adds unpredictability to the two 32 bit feedback streams, the Lower Feedback 510 and Super Tier Feedback 520 feeding the Register Bank 2030 and the Data Churn 2040; by independently transforming the feedback streams, thereby deterring message modification by adversaries who may gain temporary access to the apparatus shown and described herein.

Relevant Text outputs are output from the Result/Feedback Processor 2050 via the Cipher/Clear Text vector. Hash Value/ Tag words (used for authentication) are typically output on the Hash Value/MAC Tag vector. The 64 bit Mersenne Prime LFSR based HAIFA Counter 400, whitens, and randomizes the two 32 bit Feedback Streams, the Lower Feedback 510 and the Super Tier Feedback 520; into the Register Bank 2030, and the Data Churn 2040.

The Random Controller 2020 interacts with the Register Bank 2030 and the Data Churn 2040 to affect a plurality of pseudo random functions, wherein the Random Controller 2020 internal random generators operate on over 65 different state values and 14 logic variables derived from the Register Bank 2030 and the Data Churn 2040. The Random Controller 2020 may include a plurality of small random functions where as the Register Bank 2030, the Data Churn 2040 and the Result/Feedback Processor 2050 and the HAIFA Counter 400 included in the aggregation of 2060 which includes 32 bit state variable operators.

The Cipher Mask output of the Data Churn 2040 typically encrypts and decrypts incoming Message Words. This output serves as the input to the conceptual generic pseudo random device processor, PRD, described in FIGS. 2C, 2D, 3A and 3B. A generic module may output Salts 345 and 347 which typically would have a degree of inter and intra correlation to Message In. To assure that any meaningful knowledge of state variables in the 32 bit variables 2060 are obliterated, the HAIFA Counter 400 is randomly initiated to doubly encrypt derivations of the input Message.

Figure 2A:
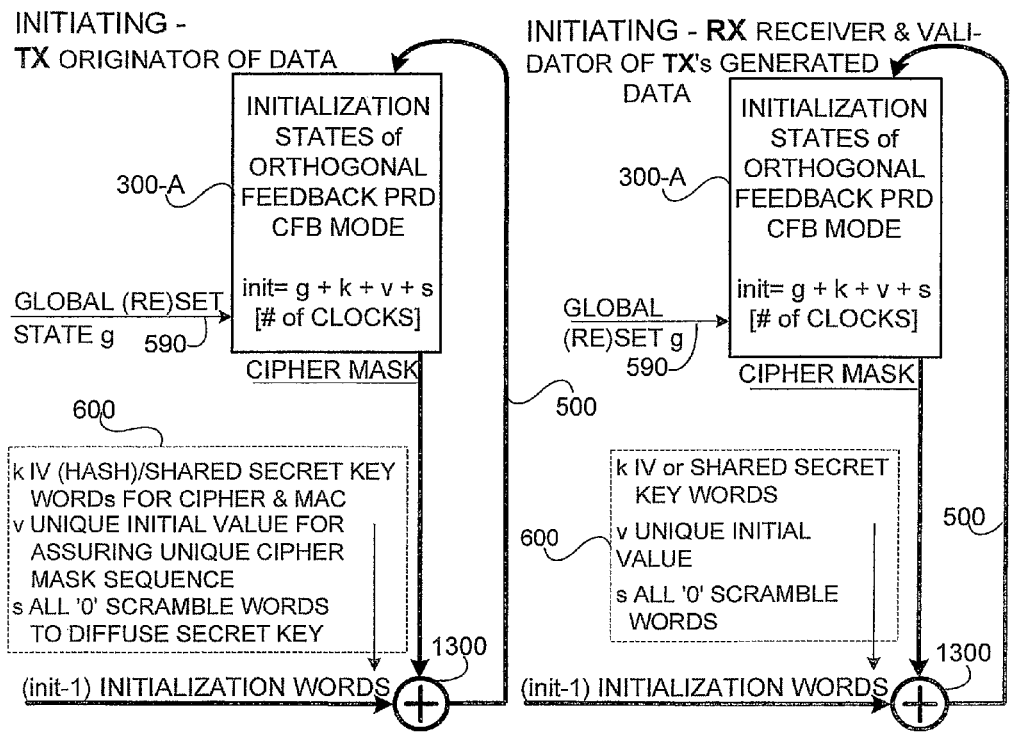
FIG. 2A is a simplified block diagram of the initialization process for the originator and receiver (typically TX or RX) of a hardware based pseudo-random function. The Initialization process is a version of the Cipher Feedback, CFB, mode, wherein the cipher output is not read, where the initial Running Key is the initial chaining value, (the condition of the binary state variables, the flip flops) following the Global (Re)Set, a hardware initialization procedure. The Dual Track Orthogonal Feedback implementation provably precludes input modification and the HAIFA Counter precludes chaining value collision, in both ciphering and hashing, because there is no truncation of the chaining values.

FIG. 2A is a simplified self explaining data flow diagram of the initialization process for the originator and receiver (typically TX or RX) of a hardware based pseudo-random function.

The Initialization process is a version of the Cipher Feedback, CFB, mode, wherein the cipher output is not read, where the initial Running Key is the initial chaining value, (the condition of the binary state variables, the flip flops) following the Global (Re)Set, a hardware initialization procedure. The Dual Track Orthogonal Feedback implementation provably precludes input modification and the HAIFA Counter precludes chaining value collision.

for performing conventional cryptographic based hashing (conventional unkeyed and keyed) wherein allegedly same input Message data is hash digested by TX and RX, wherein RX subsequently verifies TX generated HV/Tag;

for performing conventional stream cipher encryption and decryption. The Cipher Mask is not a function of the input binary message data; hence corrupted transmitted cipher text bits do not propagate subsequent errors as occurs in conventional block ciphers with cipher text feedback, encryption and decryption are identical operations as depicted in FIG. 2B;

for performing enhanced stream ciphering wherein accepted cipher or clear text data is allegedly error-free, and enciphering, decrypting and digesting processes increase algebraic cryptocomplexity and are typically simultaneously enacted; and, for "simultaneous encryption/decryption with authentication integrity", wherein hashing and ciphering are performed simultaneously in single, paired or concatenated crypto-engines; where any alleged hash value/tag or any portion of data included in a message, known previously by RX is operative to indicate to the authenticator RX the validity of the partial or entire decrypted message. If RX decrypts a portion of data in a known expected position (a single Message or a string of Message Words), while simultaneously shunting the encrypted data portion into the PRD, wherein the decrypted portion yields the expected clear text; RX receives positive indication of the validity of the transmission up to the expected Message Word or Words, exactly as an authentic HV/Tag indicates the validity of Cipher Text preceding the HV/Tag. We have included a Message counter, operable by RX to generate an interrupt, for RX's Host to ascertain if an expected Message Word is received at a predefined location.

The subsequent system defined initialization options include secret and non-secret key, initial value, IV, scramble; all input as digested Messages. In each of the three functions Message Words are encoded by the relevant Cipher Mask values and are fed back and digested/diffused into the PRD.

In all cryptographic functions, TX & RX are identically initialized with predefined parameters.

For keyed hashes, conventional stream ciphering, and "encryption with integrity", TX and RX share a secret key; typically a string of secret Messages. In conventional Hashing the PRDs are optionally brought to a predefined state by Hash Digesting a non-secret key; in typical keyed hashing, secret keys are shared by both TX and RX.

The purpose of the Scramble is to insure that the N Words are digested/diffused into all elements of the PRD. We recommended a four clock generic encoded Scramble for highest security; wherein typically system words, typically IV Words are hash digested into the PRD. In FIG. 2A the All '0' Word sequence of Sample Message Words are employed. A 4 word Scramble assures that every bit of the last IV word is diffused into the equations of almost all binary state variables in at least one embodiment in four word input clock cycles; e.g., in the generic case, wherein the efficiency of diffusion typically is not established, we suggest a more complex Scramble. For the embodiment of conventional stream ciphering, especially, and for the embodiments of encryption with integrity, an Initial Value, IV digest sequence is necessary to assure that neither the first encrypting Cipher Masks nor, in the conventional stream cipher the whole Cipher Mask sequence is not divulged to an adversary. The IV is unique, typically a true random number, and typically is transmitted and or negotiated in the clear over open communication channels. During the Scramble, following the Hash Digest of the N constants, the "HAIFA Initialization Switch Enable" in FIG. 3B, enables combining of unpredictable internal state variables with the internal variables of the HAIFA Counter. The idea of a unique binary count typically starting at zero, as in "HAIFA", is now enhanced with an unpredictable 64 bit unique start count.

Assuming that the Global (Re)Set command is a double clock operation we list a suggested minimum number of clock cycles for efficient initialization. We assume a word size of 32 bits. We estimate that at each clock, one Initialization Word is fed into the PRD, and that for:

A conventional unkeyed hash initialization including a Global Reset only, wherein there are: no Key words—k=0; no IV Words—v=0 and no Scramble Words—s=0; and init=2 [estimated clocks]; where init is an estimated number of initialization "overhead" clocks, we assume contiguous DNA input and Output;

Keyed Hashing (aka MAC) the number of suggested digested 32 bit Initialization Words is: $k \geq 4$, $v \geq 2$ and $s \geq 4$; so that init$\geq 12$ [estimated clocks];

Conventional Stream Ciphers the number of suggested digested Initialization Words is: $k \geq 4$, $v \geq 2$ and $s \geq 4$; so that init$\geq 12$ [estimated initialization clocks]; and, Encryption with Authentication Integrity the number of suggested digested Initialization Words is typically the same as for conventional hashing: $k \geq 4$, $v \geq 2$ and $s \geq 4$; so that init $z \geq 14$ [estimated clocks].

For normal security operations, secret keys may be a minimum of 8 32 bit words (256 bits), to be compatible with present emerging standards. A pair of swapped Lower Feedback 32 bit connected engines "825" support 512 bit keys.

FIG. 2B is a simplified self explaining data flow depiction of the use of hardware pseudo-random devices processors, PRDs, of cryptographic strength similar to the embodiment described above, for conventional stream ciphering. This is a block diagram of an embodiment of the Output Feedback, OFB, mode implemented with internally generated double non-orthogonal feedback streams randomized with HAIFA Counting to preclude chaining value collision.

Both TX and RX devices are initialized to subsequently emit identical sequences of Cipher Mask words. TX XORs each Cipher Mask value to a Message Word to produce Cipher Text; RX XORs its identical synchronized Cipher Mask values to relevant Cipher Text words to retrieve the alleged original Clear Text. This configuration is fault resistant; as only Cipher Text bits which are flipped in a transmission result in the same number of relevant false flipped bits in RX's Clear Text; e.g. in a TV transmission, typically resulting in off color pixels on RX's TV screen.

FIG. 2C is a simplified self explaining depiction of a CFB mode encryption/decryption implementation. Both of the Dual Track Orthogonal Feedback words are enhanced with random value HAIFA Counter chaining value collision preclusion. The initial Running Key is the chaining value set by the Initialization procedure. FIG. 2C shows the use of previously initialized pseudo-random device processors of cryptographic strength similar to the conventional embodiment described in FIG. 2B, to result in a stronger mode of stream ciphering, which is typically useful for errorless transmissions.

Simultaneously digested encrypted data is fed back into the expansion type pseudo random function in the embodiment described above; e.g. with no information loosing truncations. Both TX and RX devices are identically initialized to subsequently emit identical sequences of Cipher Mask values, iff their subsequent feedback streams are identical. In the drawing, subsequent (same) Cipher Text values are fed back at each Primary (by Host in FIG. 1 actuated) Clock into the PRD; therefore the PRD binary state variables (Chaining Values) in TX and RX remain identical, throughout the transmission; also including the HV/Tag generation sequences in FIG. 2D. TX's engine, word wise XOR sums each Cipher Mask value to each input Message Word, to generate a Cipher Text sequence. The Cipher Text sequence is simultaneously fed back into the TX PRD and is transmitted to RX or in some applications saved by TX, the text encryptor of the data, for subsequent retrieval in RX mode; RX XORs its identical Cipher Mask values to the TX generated Cipher Text words to retrieve the input Message Word sequence; while the identical Cipher Text generated by TX is also shunted via Shunt Switch stationed on contacts B around the decrypting XOR [P in the processor diagram] into RX's PRD. As a result, for accurate transmissions, RX and TX cryptographic engines are in identical typically unpredictable internal states so long as the transmission of the Cipher Text is accurate and both engines are synchronized.

The engine state variables are linearly affected by the Message Words. A single change of a bit in a first Message Word, after four or five Primary Clock cycles, typically "becomes" a well diffused monomial term in the equations of all of the binary state variables in the Data Churn, the Register Bank, and the Result/Feedback Processor of FIG. 1. Neither the Clear Text nor the Cipher Text affects the equations in the typically unpredictable 64 bit Mersenne LFSR Based HAIFA Counter. The HAIFA Counter is typically unpredictably initialized during the Scramble which follows the IV initialization sequence. Salt Words from the Data Churn, FIG. 1 are combined with the state variables in the HAIFA Counter, when the HAIFA Initialization Switch is enabled; as shown in FIG. 6.

During valid transmissions, at every clock cycle all binary state variables in TX and RX engines have identical values; as initialization of identical PRD engines is identical, and subsequent aberrating identical feedback, the only input to the PRDs, is identical. The typically unpredictable feedback into PRD engines is a valid Hash Digest because the Dual Track Orthogonal Feedback includes encrypted linear transformations of each bit of the m Message Words. One flipped bit is operative to affect a large number; e.g. typically over 300, of the engines' binary state variable equations, thereby, into a random state in 4 clocked cycles.

Figure 2D:
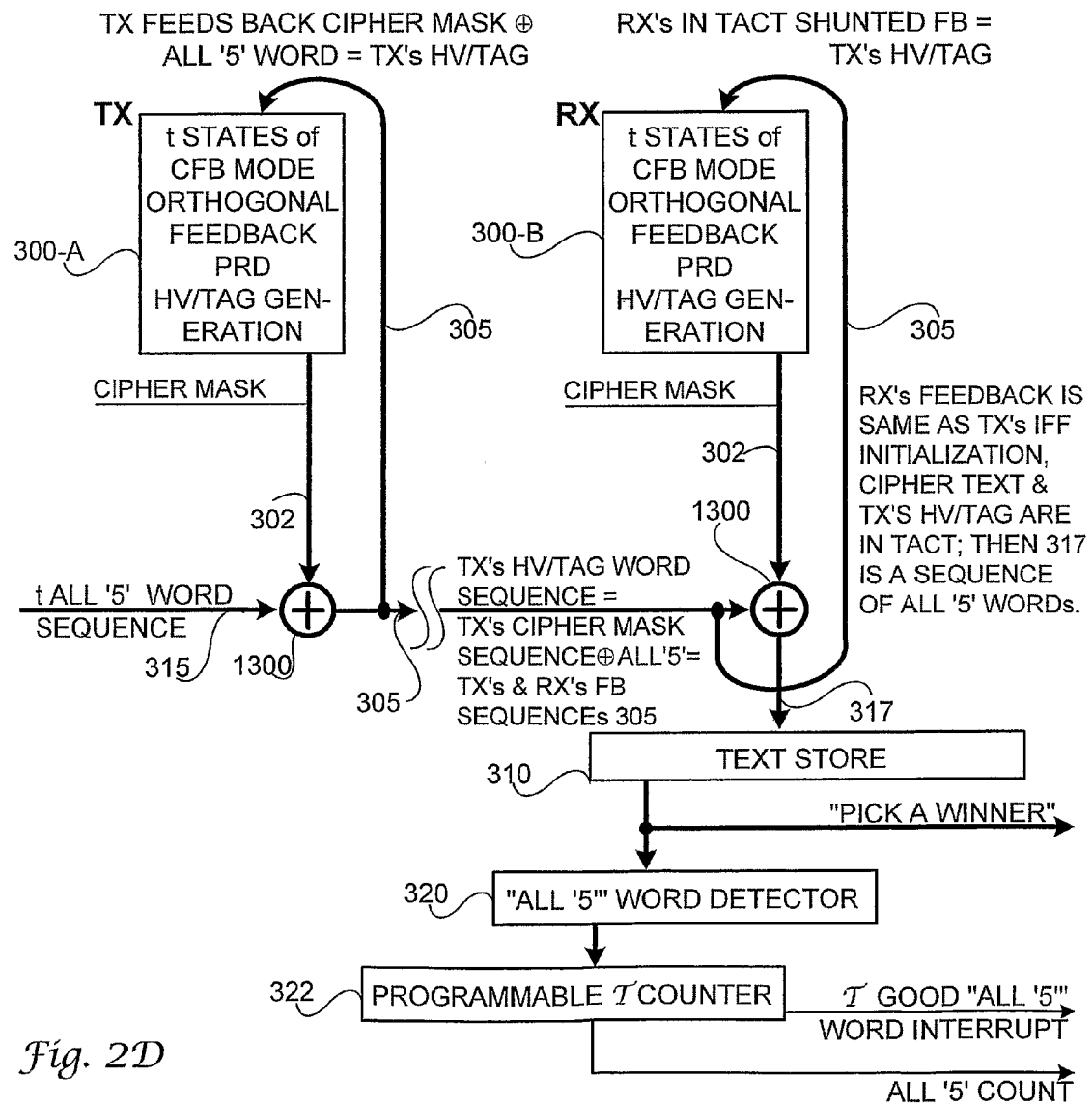
FIG. 2D is a simplified depiction of the new CFB mode encryption/decryption implemented with Dual Track Orthogonal Feedback enhanced with random value HAIFA Counter anti chaining value collision and whitening. The initial Running Key is the chaining value following the Initialization procedure.

FIG. 2D depicts a self explaining data flow diagram of a final stage Hash Value/Tag (HV/Tag) validator generation in the simultaneous encryption with authentication integrity sequence. We assume that RX's shunted feedback and TX's generated feedback, are identical, as the transmission channel is assumed, in the first instant to be typically in tact; i.e., the transmission channel is errorless.

During the HV/Tag generation, in FIG. 2D, the TX device Message input is locked to All '5' Words $(5555\ 5555)_{16}$ HV/Tag generation words. Therefore both the output HV/Tag of TX and the feedback to RX is TX's Cipher Mask word XOR summed to '5555 5555' at every clock cycle. The input to RX's XOR decryptor is also TX's HV/Tag sequence. Again assuming intact variables, RX's Cipher Mask sequence XOR summed to TX's HV/Tag emits the HV/Tag generating All '5' string of words. The emitted All '5' words, (or any optional HV/Tag generating data words) are stored in the Text Store. TX and RX at each clock have identical Chaining Values in all stages. If TX Cipher Text, or HV/Tag data, or Hash Digest include an encrypted All '5' word the output of RX's XOR decryptor XOR would emit an All '5' Word into the Text Store. At the next clock cycle the All '5' Word Detector typically ticks the Programmable $\mathcal{T}$ Counter which typically flags the Host with an Interrupt at count $\mathcal{T}$. Optionally, the Counter is set to cause an Interrupt after a defined number of HV/Tag words have been verified. If TX inserts All '5' words (or any proprietary words or phrases) in predefined locations in structured/formatted Clear Text, RX receives expected indication from the Text Store that up to the location, RX knows the origin of, and the validity of received Cipher Text and deciphered Clear Text.

To avert alerting the Host of an early count of All '5' Words in at least one embodiment, any occurrence of a non-All '5' Word following an All '5' Word reset RX's All '5' Counter. A double All '5' Word at the end of a lengthy message generating an Interrupt is operable to serve as an indication to the Host that the message communication is finished and probably valid, wherein the following decrypted HV/Tag generation proprietary words finalize the authentication with a typical laudatory phrase. Typically, RX's Text Store is operative to seamlessly output the entire decrypted message and the entire HV/Tag generating sequence, whilst proving that the Cipher Text values emanating from TX and RX's PRD are identical.

FIGS. 3A and 3B depict simplified blocks of circuitry of the Result/Feedback Processor; operative to generate and/or digest some or all of the following:

a. dual track feedback not affected or affected by input Message Words;
b. keyed and unkeyed initialization tailored to levels of security, reliability of communication channels and size of data input;
c. a seamless string of Message input for single pass and multi-pass modes of TX and RX encryption and authentication;
d. input alleged Hash Value/Tag to automatically indicate validity to the Host; and
e. Hash Values/Tags; of frames of data arriving over noisy channels to implement authenticated transmissions of long files to be stored in the clear or encrypted with a single Hash Value/Tag.

All data on the Message input is XOR combined to the Cipher Mask value and is input to the 0AB Switch and the Text Store. Typically, the Text Store is read solely if the data is an encryption of clear text Message input; or a decryption of cipher text Message input, or a II-Promotional HV/Tag, typically read with All '5' Word delimiters.

As was shown in FIGS. 2A, 2B, 2C and 2D, Message words are isolated or introduced into the PRD in three different modes affected by the 0AB Shunt Switch which performs some or all of the following selectable functionalities:

a. isolates the Message input from the PRD for conventional stream ciphering, with Shunt Switch stationed at '0' contacts. The feedback streams are not affected by Messages encrypted or decrypted by the XORed sum of the Cipher Mask value and the Message Word, and input clear text data is encrypted; input cipher text is decrypted; and the output cipher or clear text is read by the Host via the Text Store; the operation does effect a Hash Digest, and does not affect the Chaining Values; or,
b. inputs Message Words, typically Initialization variables, Clear Text or HV/Tag generation variables, which are XOR summed to the Cipher Mask value, with Shunt Switch stationed at 'A' contacts. In the TX encryption with integrity process, typically, generated Cipher Text is read from the Text Store, and same Cipher Text is digested into the two streams of orthogonal feedback in the Result/Feedback Processor. In the Initialization digest processes in TX and RX, where typically the Text Store is not read, the same encrypted Key Words, IV Words and Scramble Words are similarly digested into the two streams of orthogonal feedback in both TX and RX's Result/Feedback Processor. Typical TX HV/Tag generation includes XOR summing of the HV/Tag generating words to the respective Cipher Mask values; emitting the HV/Tag word via the Hash MAC Store and similarly digesting the HV/Tag words into the two streams of orthogonal feedback in the Result/Feedback Processor; or,
c. XOR-sums the incoming Message stream, which typically includes encrypted data or an HV/Tag from either TX or data stored in memory, typically from TX, to the Cipher Mask value, with the Shunt Switch stationed at 'B' contacts wherein the XOR decrypted sum may be read out of the Text Store, or ignored; simultaneously, the message stream is shunted and hash digested into the RX PRD. In the authentication phase, an alleged HV/Tag, typically generated by the originator, TX, is digested into the RX PRD. In certain embodiments, the All '5' 32 bit word, $(5555\ 5555)_{16}$, is a Message input used in the HV/Tag generation by TX in one embodiment. At each Primary Clock, the HV/Tag input word is encrypted and loaded into the Text Store. The receiver, RX Host, is typically operable to read the encrypted HV/Tag input word from the Text Store. If the HV/Tag generating Message input is the All '5' Word, each word in the validating sequence is detected in RX's All '5' Detect and Count; wherein the number of consecutive All '5' words are counted. Typically, at a user defined predetermined count, an interrupt is generated to the RX Host to indicate the validity of the source and the derived clear text.

For all embodiment operations, typically, Initialization of TX and RX is identical, with Shunt Switch at 'A'. Consequently, in the valid initialization digest sequence, the Shunt Switch output is TX or RX's identical Initialization generating Message sequence, XOR summed to TX and RX's identically generated Cipher Mask sequence.

If all data is valid, and TX and RX, with Shunt Switch at 'A', identically initialize their respective engines with a first Global (Re)Set followed, by any identical designated shared keys and/or initial values; typically, we are assured that the two engines are synchronized, with identical Chaining Values (internal state variables) for the start of an entire session. Typically, if TX's encrypted output with Shunt Switch set at 'A', is without fault shunted through RX's Shunt Switch set at 'B', the Chaining Values (all internal state variables) of the equivalent engines are identical at every clocked cycle.

If all TX and RX inputs from the Shunt Switch output are identical and TX and RX were identically Initialized; the Cipher Mask values and the salts from the Data Churn, (the Cipher Mask, the Lower Feedback Salt and the Super Mix Salt) are also identical in TX and RX.

After Initialization, conventional Stream Ciphering is executed with Shunt Switch at '0', wherein no Hash Digest (output from the Shunt Switch is not affected by Message Word input) aberrates either TX or RX's PRD. The combined unpredictable salts and HAIFA Counter generate strong tested Lower and Super Tier Feedback Streams which are typically diffused in many hundreds of gates of such a system embodiment.

Hash Digesting commences with the generation of two orthogonal Message based streams, with a hardware strategy proven in "825", based on two consecutive Message Words. At each Primary Clock, the Present Result output of the Shunt Switch XOR summed to the Previous Result, which was loaded into the Hash MAC Store during the previous Primary Clock cycle, is the precursor of the Lower Feedback hash digesting stream. The orthogonal Present Result output transformed in the MAC MIX nibble reverser is the precursor of the Super Tier hash digesting stream.

The two precursors of orthogonal hash digesting streams are combined to the typically unpredictable salts and pseudo random sequences which are the precursors of the conventional Stream Cipher Lower and Super Tier feedbacks. The Lower Feedback Salt (state variables) and the Least Significant 32 variable bits from the Mersenne Prime HAIFA LFSR Counters in FIG. 6A, hereinafter "HAIFA Counters", are combined to the input of the Lower Feedback Store; the Super Mix Salt and the Most Significant 32 bit state variables of the HAIFA Counters are combined to the input of the Super Tier Feedback Store.

The Lower Feedback Salt and the Super Mix Salt are non-linear derivations of typically unpredictable internal state variables from the Data Churn; the salts whiten and are operational to decrease unexpected statistical bias in the final feedback streams. The HAIFA Counters' random count sequence, being uncorrelated to the Message XOR summed to the Cipher Mask streams and the salts, grant a unique 64 typically unpredictable bits to each Chaining Value, thereby precluding two identical Chaining Values occurring in any expected hash digest session; i.e., processing lengths, typically less than $2^{63}$ Message Words.

The HAIFA Counter is activated by every Primary Clock. During the Scramble sequence following the unique Initial Value digest sequence, the unpredictable output of the Lower Feedback Salt Store is XOR summed to the pseudo random states of the MS bits of the HAIFA Counter; and the unpredictable output of the Super MIX Salt is XOR summed to the pseudo random states of the LS bits of the HAIFA Counter. Following the Initial Value digest, at the outset of the Message processing, the HAIFA Counter is therefore in an unpredictable initial hash digesting state. The subsequent HAIFA Counter pseudo random sequence is typically, unpredictable to an adversary who does not know the relevant secret initializing key.

The two tracks linearly affect six different multipermutation pseudo random 32 bit words in the Data Churn and the Register Bank in the ZK-Crypt embodiment.

The All '5' Counter is reset if the counter value is more than zero, by the first occurrence of a non-All '5' Word in the detector.

In the self explaining FIGS. 4A and 4B we assume that TX and RX have been identically initialized. FIGS. 4A and 4B depict the conventional unkeyed hash process (and keyed hash; aka MAC—Message Authentication Code process), wherein both TX and RX allegedly first input identical binary data to be Hash Digested. TX then proceeds to generate the HV/Tag; typically by inputting a string of All '5' Message Words. TX outputs the HV/Tag via the Hash MAC Store to RX.

In the embodiment in FIGS. 5A and 5B, an optional message of arbitrary length is inserted into the HV/Tag generator sequence. The delimiters are All '5' Words. RX in FIG. 4B first inputs allegedly identical same typically Clear Text. However, instead of generating the HV/Tag sequence with All '5' input words, RX shunts the encrypted All '5' word HV/Tag from TX via the B shunt, which if all is proper and intact, may generate the same Cipher Mask sequence. As the input and generated sequence of a proper HV/Tag check are same, the XORed sequence into the Text Store is All '5' (5555 5555) words; is detected, and its successful receipt is recognized by the Host. The optional commercial message in FIG. 5A of arbitrary length is decrypted, along with the All '5' delimiters which flag the end of the encrypted message and the end of the II-Promotion.

FIGS. 5A and 5B depict the status of TX and RX engines embodying the unique chaining value at the specific process step in the simultaneous Encryption with Authentic Integrity functions. Each block describes an engine condition, with an input, an output and a feedback into the PRD which affects the engine at the next Primary Clock cycle.

As shown previously, at each stage, the PRDs in TX and RX are identical; the values of TX and RX's Cipher Masks are identical; and the feedbacks into the PRD are identical.

At the start of the initialization phase, which is identical to TX and RX, the engines' binary state variables are Globally (Re)Set to a predefined, "Wake Up" state (all state variables are set to '1' or '0') that efficiently prepares the engines to virtually immediately diffuse (we often say "Hash In") every Key or Message Bit into all state variables of the PRD in typically four clock cycles.

In the depicted Encryption with Authentication Integrity embodiment, the first step of secured, unpredictable to an adversary, initialization includes "Hashing In" shared by TX and RX secret key and "initial value" key words. To assure that all bits of any non-zero IV are Hashed in (digested into) the engine, unpredictable to an adversary, a protocol is provided which typically includes the Scramble Process. Each Scramble includes encryption of All '0' Messages; the Cipher Mask value XORed to an All '0' (0000 0000) word outputs the unchanged Cipher Mask value. The Scramble Process feeds back the Cipher Mask sequence into the PRD. A typical Scramble operation hash digests four All '0' Message words, in four clock (machine) cycles of the engine.

A process to prevent an adversary from resending an identical transmission, the contents of which he knows, more than once, is to finalize the Initialization Process for each transmission session with "digested in" unique shared, (can be non-secret), Initial Value, IV, Words. [The IV is especially vital for conventional Stream Ciphering, as without the IV, the en/decrypting Cipher Mask sequences initialized with a reused secret key would be the same for every session; and easily learned by an adversary who obtains one matched clear text cipher text sequence, from a session that the adversary initiated.]

Because of the massive diffusion of all bits of input non-zero Message Words into the engine state variables, all bits of the Initial Value Word inputs are effectively diffused into the all main components of the engine, in the embodiment described above, after four clock cycles.

The encryption/hash MAC digest of TX's Clear Text simultaneously outputs the encrypted Y vector, and hash digests the Y vector into the PRD.

RX allegedly receives the intact cipher text vector, Y, which it both decrypts (reads out to the Text Store) and shunts (switch set at station B) into the PRD; RX allegedly feeds in the same Y vector that TX generated into RX's PRD, allegedly maintaining TX and RX internal variables in an identical sequence of Chaining Values. Both TX and RX may input the same number of Scramble words (or alternately pad the IV sequence identically). Both TX and RX may input the secret key or a derivation of the secret key; and/or both TX and RX may input the stored header; or the Shared Value input stage may be deleted; as it is probably redundant.

Both TX and RX may generate the HV/Tag; TX typically generates by inputting (encrypting) the All '5' sequence which it transmits to RX; whilst RX shunts in TX's transmission, which typically is equal to RX's Cipher Mask sequence, as RX's and TX's PRD have allegedly been fed with identical feedback. RX also XORs TX's transmission to its own Cipher Mask sequence. If all is well, both sequences are equal, the Text Store receives the All '5' sequence; and the All '5' Detector, Counter reports successful validation with a Valid Interrupt to the Host, automatically. (In the event that a Π-Promotion is inserted, two Valid Interrupts are activated.

FIG. 6A depicts the Mersenne Prime LFSR based HAIFA Counter, which unpredictably whitens, encrypts and affords both the Lower and Super Tier feedback words, included in the Chaining Value, a unique unpredictable count, which provably assures that no two Chaining Values in a sequence of more than $2^{63}$ Message Words can be equal. Conventionally we say that there can be no collisions in the Chaining Values. During the Scramble sequence, following the IV initialization sequence, the finite state machine XOR inputs two unpredictable Salt values emitted from the Data Churn, to finalize the initialization of the HAIFA Counter to an unpredictable initial state. As the IV value is typically unique for every session, during the Scramble sequence we are assured that the IV value has diffused into the PRD and the salted HAIFA Counter may be initialized prior to the input of this first Message Word, to an unpredictable state.

FIG. 6B depicts a 19 bit prime length pseudo random linear feedback generator; a basic element of a HAIFA Mersenne Counter. The chosen 19 bit LFSR Counter has taps into outputs of cells 2, 6, 8, 9, 11 and 18. The Salt inputs actively initialize the HAIFA Counter, typically during a Scramble sequence. The normal LFSR Feedback implements full length sequence of pseudo random outputs, $2^{19}-1$. The NFIX gate 410-19-NFIX assures that the LFSR can never be in a Stuck on Zero stage for more than one count. The cell descriptions of 419-19-s02 in FIGS. 6B and 6C are equivalent.

FIG. 7 depicts the seamless data flow input and the relevant output of the four basic processes regulated by the Result/Feedback Processor where:

a. Sequence A describes the conventional hash data generation flow in TX and RX, wherein only the HV/Tag output is observed;

b. Sequence B describes a conventional Stream Cipher encryption (or decryption) sequence, where the encrypted document does not affect the cipher engine; the LTE extraction is typically necessary for continuous packet decryption, c. Sequence C describes the TX Encryption with Authentication Integrity; and d. Sequence D describes the RX Decryption with automatic Authentication Integrity.

Prior to an explanation of these four basic sequential data flows, we describe the data segments which are input, and those elements which are typically used and/or saved, in a typical sequence. To assure that all state variables' (the Chaining Values'), flip-flops, assume the defined initial procedural start value, which assures quick unbiased diffusion of all Message bits, a Global Reset command, aka Global (Re) Set 3050 is initially enacted by the Host. Conversely, at the end of an HV/Tag authentication sequence, HV/Tag Generation 3020, a careful programmer typically chooses to return the PRDs 3300 and 3400, to the known Global (Re)Set 3050 original condition, operative to remove trace of previous procedures.

Short term protection of transmissions can be protected with a confidential optionally unique Transport Code, TC 3010, typically is operable to uniquely initialize RX and TX in user defined short messages. We suggest using a short Transport Code, TC 3010 when it is deemed necessary to prevent an adversary from knowing if a valid transmission was properly received. In Transport Code initialization, typically, simultaneous to digesting the TC 3010, the HAIFA Initialization Switch Enable is activated to initialize the HAIFA Counters 400. For longer term protection of the apparatus of the present invention, a Scramble sequence 3040 may follow a unique TC 3010.

A document, DOC 3015, typically is a user defined data sequence of arbitrary Message Words. The TX HV/Tag generating input of All '5' ($5555\ 5555_{16}$) Message words, 3020 serves to cause an output sequence of encoded with All '5' Message word Cipher Mask values Tag [DOC] 3030, which reflect the unique Chaining Value, the status of all binary state variables of the PRD 3100 following the encrypt and hash digest sequence of the DOC 3015. We assume that after 4 HV/Tag generation clock cycles 3020, all bits of the last DOC 3015 word are reflected in equations of over 300 state variables in PRD's 3015 Chaining Value. The Π-Promotional sequence in FIG. 5 serves as a Scramble assuring in tact diffusion of the last encrypted Messages.

For simplicity in explaining functions B, C and D, we assume Clear Text DOC 3015, to be identical. Typically, any input Message Word is processed in one machine clock cycle; each processed word is typically output at the beginning of the next Host initiated clock cycle.

A complete secured initialization process typically includes digesting a secret shared TX and RX Key 3035; a unique Initial Value 3045 or 3047 and a Scramble input of typically All '0' ($0000\ 0000_{16}$) words 3040; to enable PRDs 3200, 3300 and 3400 to generate unique typically unpredictable Cipher Mask sequences in every communication session. Stream Cipher Initializations, 3049 in embodiments B, C, and D, are identically constructed.

Hash digesting embodiments as in PRD process 3100 include an Initialization optionally operable with a Transport Code, TC, 3010, shared by TX and RX. If TC 3010 is a known constant, the PRD process 3100, is suitable for initialization of unkeyed Hash Digesting of DOC 3017. Secret unique for each transmission TC 3010 typically provides short term safe Initialization for confidential keyed hash procedures.

The secret shared Key 3035 can safely be reused many times in safe protocol communications between TX and RX. Safety is typically assured to trusting communicants if the Key 3035 is recorded in each party's secured memory where the key is not available to an unwanted third party; and typically, iff a unique IV 3045 is diffused into PRDs 3200, 3300 and 3400 followed by a Scramble sequence 3040.

The Scramble sequence 3040 typically serves to complete digestion of all bits of the IV 3045 and 3047 into PRD's 3200, 3300 and 3400 Chaining Value.

Initial Values, IVs 3045 and 3047 are typically unpredictable numbers which are typically generated by either TX and or RX, and are typically unique, but typically can be public knowledge. Conventional stream ciphering is based on the premise that with a defined initialization, any and every encryption session (with the same secret key) generates a set sequence of Cipher Mask words. Without IVs 3045 and 3057 adversaries typically derive a single Cipher Mask sequence from knowledge of a typically available cipher-clear text pair of Message sequences. Without a unique IV 3045, typical conventional Stream Cipher communications are operable to generate identical, reproducible Cipher Mask sequences, usable to fraudulently encrypt communications to a trusting receiver, RX, sharing the same Secret Key 3035. Digestion of unique Ws 3045 and 3047 assures unique session initializations, and unique salting sequences used to initialize the Mersenne Prime based 64 bit HAIFA Counter 400 of FIG. 6A.

In those instances in processes 3100, 3300 and 3400, where the last output word concludes a procedure, e.g., the last word of HV/Tag 3020 is "stuck" in the Text Store 310 of FIG. 3B pending an additional clocked activation. The last clocked remaining final Chaining Value is irrelevant as the last HV/Tag has been generated. Any value clocked in Don't Care Word, Ø 3025, is typically operable to enable extraction of the last HV/Tag word which is stored in the Text Store 310 in FIG. 3B. (The Cipher Mask encrypted Ø 3025 word is typically irrelevant and not read.)

Consider the following problem of Continuous Element Stream Cipher transmission of data elements, wherein the elements are not by definition of a constant size, e.g., random sized frames, which are generated at random intervals, especially wherein the total session is later stored in memory without defined sized data elements. Accurately extracting the last encrypted Message word of a first element via the Text Store 310 in FIG. 3B is only possible when the first Message word of a second element is processed; i.e., clocked in. Clocking in any false Message word, e.g., an Ø 3025 input Message word, typically immediately corrupts PRD processes 3300 and 3400 Lower and Super Tier Feedback Stores, 395 and 375 respectively; and typically desynchronizes uncompensated Cipher Mask sequences of conventional Stream Ciphers.

Command LTE, Last Text Extract 3052, shunts this last processed word which resides on the input of the Text Store 310 in FIGS. 3A and 2B to the Text Store 310 output, without clocking PRDs 3200, 3300 and 3400. The Host thereby, typically, reads the "last word" with and LTE Command, without activating the PRD's clock. Extricating the last word of the data element, with a Don't Care Word, Ø 3025, would otherwise corrupt the final Chaining Value. This last typically encrypted word is repeated as the first encrypted word of the next transmitted data element. Typically, identical encrypted words are operable to indicate to RX that a second encrypted data element is received in a proper order, and that RX and TX's PRDs, 3300 and 3400 are synchronized.

Consider now Continuous Element Stream Cipher transmission of data elements, wherein the elements are typically of a constant size, e.g., standard packets or frames. The last encrypted Message Word of the first data element is operable to be extracted with a predefined clocked in Message Word; e.g., typically the All '0' Word, without loss of security, as in the following example.

RX is operable to prepare its PRD procedure, 3200 to receive the next data element, e.g., frame, by clocked in encryption of the All '0' Word, knowing that the expected decrypted Word is typically TX's last Cipher Mask value; i.e., the last Cipher Mask value XOR summed to the All '0' Message Word. This last Cipher Mask value typically is operable to be both TX and RX's Text Store 310 word output in the contiguous data element. RX typically checks the received and self generated word. If they are identical, RX typically receives positive indication that the data element arrives in the proper sequence, and that the TX PRD process 3300 and RX PRD process 3400 are synchronized. This procedure is not recommended for storing in memory.

Encrypted Document, ENC [DOC], 3055 is the output of the conventional stream cipher encryption sequence on DOC 3015, wherein the Cipher Mask value is not a function of the Message words, typical of a fault resistant arbitrary length data element output.

Encrypted Document, ENC [DOC] 3057 is the output of the stream cipher/hash digest sequence, typical of a financial encryption with authentication. ENC [DOC] 3057 and the TAG [DOC], the HV/Tag are appended to the initialization of engine sequence 3400 to simultaneously retrieve DOC 3015, hash digest the ENC [DOC] 3057 and transparently prove validity via the All '5' Detector which outputs All '5' words 3060.

In Engine Configuration 3500 Shunt Switch 300 FIG. 3 is set on station "A" both for the Initialization and direct digesting of ENC [DOC], as for TX in both process 3100 and 3300.

In Engine Configuration 3520, Shunt Switch 300 FIG. 3 is moved to contacts '0' after initialization, to isolate Message input from the PRD, thereby to enable fault resistant transmission (no error propagation) of encrypted data.

In Engine Configuration 3510, Shunt Switch 300 is moved to shunt position B after Initialization to properly decrypt and hash digest the ENC [DOC] 3057 and to generate and compare HV/Tags.

In certain embodiments, the Scramble sequence follows the IV sequence.

Examples A-D in FIG. 7 depict the seamless data flow input and the relevant output of the four basic processes regulated by the Result/Feedback Processor. All operations demonstrate seamless uninterrupted data word inputs, wherein:

All operations demonstrate seamless uninterrupted data word inputs, wherein:

a. Example A depicts a seamless HV/Tag generation input sequence embodiment, as shown in FIG. 3A, including;
optional Transport Code initialization;
CFB mode Hash Digest of clear text DOC;
the CFB mode 'G', All '5' Word HV/Value generating sequence, shown in FIG. 3A;
the clocked "don't care" word to eject that last HV/Tag word; and the good housekeeping Global (Re)Set, RST, operation to open and close crypto sessions. Only the HV/Tag is output.

b. Example B depicts a first frame, DOC, TX encryption transmission input sequence embodiment for Stream Ciphering in OFB, with Switch @0 contacts, and in CFB enciphering mode with Switch @A contacts, including:

initialization with secret Key, IV and Scramble, with Switch @A contacts;

encryption of a first frame (to be followed later, by at least one more frame);

and the LTE, last text word eject command (not a Word input) operational to extract the last "waiting for the next clock" encrypted DOC word, without waiting to input the first word of the next frame;

and, therefore, without corrupting the last chaining value prior to delayed processing of the next frame enciphering sequence.

Only the encrypted frame is output.

c. Example C depicts a seamless TX type Encryption with Authentication generation input sequence embodiment, as shown in FIG. 5A; including:

cipher initialization, as performed in Example B;

encryption with simultaneous CFB hash digest;

the 'G', All '5' Word HV/Value generating sequence, also shown in Example A; followed by, the clocked "don't care" word to eject the last HV/Tag word. The encrypted DOC and the HV/Tag are output.

d. Example D depicts a seamless RX type Decryption with Authentication generation embodiment input sequence; including:

typical Cipher Initialization, as performed in Example C;

decryption with simultaneous CFB hash digest on TX generated cipher text;

decryption of TX generated HV/Tag with simultaneous CFB hash digested TX generated HV/Tag, to simultaneously provide the Cipher Mask sequence for the decryption reconciliation of the G (herein All '5' Words) sequence.

The output from the Text Store is optionally read by the host. The output from the Text Store is input to the All '5' Detector, operative to authenticate all or a portion of the G sequence;

each All '5' Word detection ticks the programmable All '5' Word Counter, operative to generate an Interrupt to the host, indicating successful receipt of an authenticated reconciled DOC.

FIGS. 8A, 8B, and 8C describe complete multi packet transmissions of encrypted and authenticated frames of binary data; as typically may be used for transmissions over open channels to be confidentially stored; e.g., in encrypted boots and procedural programs and data bases in allegedly reliable memory, wherein the given, or a new secret key, the particular IV and the HV/Tag are kept for validating. TX and RX each use two identical engines, identically initialized with secret keys and Ws for the first frame transmission.

For a session process, we assume that TX and RX share a secret key, and an IV, and that TX generates a Transport Code, TC aberrated by an Index #i. For every frame, i, transmission TX and RX may derive a new TC aberrated by Index #i.

Essentially, one engine is used to authenticate transmissions, to enable RX to hash digest/stream cipher decrypt a sequence of positively validated individual frames in the sequence, knowing in advance that the received encrypted frame data has been validated, before RX incrementally decrypts and digests each individual frame. Following the encryption in TX and decryption in RX of the last frame, TX generates the All Frame Tag, and RX generates and compares its generated All Frame Tag with TX's version.

Each frame transmission is validated, optionally veiled by the indexed TC. In the event that the transmitted HV/Tag of the frame is found faulty, RX typically requests a repeated transmission, which must be successfully consummated before RX can continue to hash digest/decrypt the frame. RX saves all frames, but does not save HV/Tags from each frame. Implementations in systems with regulated error correction codes may typically avert most of RX's request for repeated transmission.

The All Frame Tag serves as final proof of validity of the multi packet transmission, of the authenticity of the encrypted data and the origin of the data. Typically, RX need only store the encrypted data in a single sequence, concatenated to the All Frame Tag which automatically may prove to RX the integrity of the stored data, prior to future use.

FIGS. 9A and 9B describe a generic embodiment of a pseudo random function generator, PRFG 1101, which includes previously described PRD 1100 embodiments in FIGS. 2A, 2B, 2C, 2D, 3B, 4A and 4B.

The PRFG also includes an optional single clock massive diffusion of a present input data word, into the PRFG Cipher Mask output at a next clock. This allows single or multi word initialization, en/decryption, and hash value generation/validation. Single clock initialization and hash value security, in such instances is commensurate with the PRFG word size. Word lengths of 128 bits and more are envisioned, as in "825". The example in FIGS. 9A and 9B shows a single clock initialization, step, a single word of clear/cipher text and a single word hash generator/hash value-tag output.

Typically, for single clock single word initialization, the bits of a unique sparse Initial Value are XOR summed into, and interspersed into known intervals of the shared secret key. The intervals are commensurate to the average statistical diffusion of an input bit on the chaining value, and especially the Cipher Mask. In the ZK-Crypt implementation of "825", with the shunted internal critical path shorteners; full diffusion into the Cipher Mask is achieved on the next clock cycle, and changes are included in the equations of a minimum of 300 chaining value bits.

Typically, maximizing single bit immediate diffusion entails shunting internal buffer stores which were operative to decrease lengths of internal critical paths, i.e., the maximum number of semiconductor gates that one input variable traverses before "arriving" at a buffered input. Each path gate has its own propagation time, where the maximum operating frequency of a semiconductor circuit is an inverse function of the largest critical path. Lengthy slowed down signals destabilize other signals in their wake, causing greatly increased current consumption, as affected gates oscillate.

A valid system requires that TX PRFG 1101 and RX PRFGs 1101 be identical or functionally equivalent, identically initialized, wherein at each synchronized clock, and during a second phase both PRFGs 1101 receive identical TX generated data word inputs operative to maintain identical PRFG output values emanating from the output buffer-cipher mask 1102. We claim that the highly diffusive method of initialization explained herein, where data is hash digested (diffused) as explained previously in FIG. 2A, is more efficient; but ourselves have previous embodiments wherein the initiation values were input directly into binary state variables of the PRFG 1300.

A second essential element in both TX and RX PRFGs is an XOR Combiner 1300, operative to simultaneously receive data words from the data buffer 1301, and pseudo random data from the cipher mask 1102.

In both TX and RX, the XOR combiner 1300 serves to encode (encrypt or decrypt, respectively, see FIGS. 2A, 2B, 2C and 2D) data words received via the data buffer 1301 with pseudo random data words output from the cipher mask 1102.

The encoded data is typically directed to the host sampler 2005. During initialization, the encoded proprietary data is typically not read by the host sampler, 2005, but is input into the third essential element, the switching function 300.

During the normal phase of encryption with integrity this output data is typically read by the host sampler 2005.

Said third essential (in some embodiments) element, the switching function 300 has three inputs and one output, which feeds the PRFG 1101. The "0" input, is used for conventional stream ciphering of data, as described in FIG. 2B, wherein the data input does not affect the PRFG 1101; i.e., the input is "0" and irrelevant to the present example.

A second input, as shown as a solid line in FIG. 9A, with Switch Function @A, directly connects the output of the XOR combiner 1300 to the input of the PRFG 1101. During initialization of TX and RX with shared key and initial condition data, this switch position is always linked as in FIG. 2A with the Switch Function @A. This assures that at the start of the communication stage, all binary state variables, and the initial next phase chaining value in TX and RX are identical.

In the TX configuration of FIG. 9A, as shown in FIGS. 2C and 2D, in the normal phase of TX communications with RX; two classes of encoded data of interest are fed (hashed digested) into PRFG 1101 via the switching function 300.

Simultaneously, said encoded data words are transmitted via the host sampler 2005 to RX as shown in here and in FIGS. 2C and 2D.

In the RX configuration of FIG. 9B, as shown in FIGS. 2C and 2D, in the normal phase of TX communications with RX; the two classes of TX encoded data of interest are fed (hashed digested) via the switching function 300 in the third shunt position, thus insuring the identity of input into the TX and RX PRFGs.

Simultaneously, said same TX encoded, typically encrypted data words are transmitted via the TX host sampler 2005 into the RX data in buffer 1301, FIG. 9B to the RX XOR combiner as shown in FIGS. 2C and 2D. If all is intact, including the transmission channel, the two classes of encrypted data of interest which were input to RX, are XOR combiner sum decrypted and output to a host sampler 2005. Typical definition and predictability of data words in the example follows:

TA1=RA1 in the example is the unique shared TX-RX key/IV data;

TA2 is a first data of interest, DOI 1, is typically confidential Clear Text;

TA3 is a hash generator word, DO2, known by RX and is optionally an embedded word in a semiconductor embodiment;

TB1 is the enciphered unpredictable TA1 by predictable TC1, output of the TX PRFG; TB1 is unpredictable;

TB2 is the enciphered TA2 by TC1, cipher text, both words are typically unpredictable; TB2 is unpredictable;

TB3 is the enciphered by TC3, TA3 hash generator word; hence TB3 is a defined hash value.

The status of the I/O data flow, subsequent to the Global Reset operation as seen in single and multiple data inputs for the TX and RX is summarized in the following table:

|  | In TX what's input? | In TX what's output? | In RX what's input? | In RX what's output? |
|---|---|---|---|---|
| PRFG- Pseudo Random Function | TB1, TB2 & TB3 Initialization, and Normal Operation Output of TX Switching Function Switch @A All words are Unpredictable | TC1, TC2 & TC3 Except for 1$^{st}$ TC1 Initialization word- Global (Re)set PRFG Output-Data are Randomized TB1, TB2 & TB3) All other words are unpredictable Identical outputs in RX and TX, | Initialization RB1 = TB1; Shared Identical to TX Switch @B Normal Operation Switch @B TB2 & TB3 Output of TX XOR Combiner and into RX PRFG via Shunted RX Switch & into RX XOR Combiner | RC1, RC2 & RC3 Except for 1$^{st}$ TC1 Initialization word- Global (Re)set PRFG Output-Data are Randomized RB1, TB2 & TB3) All other words are unpredictable Identical outputs in RX and TX, |
| Switching Functionality | TB1, TB2 & TB3 to XOR combiner output - only Switch @A | TB1, TB2 & TB3 Output to TX PRFG Switch @A | Initialization RB1 = TB1; Shared & Identical to TX the output of the RX XOR combiner Switch @A Normal Operation Switch @B TB2 & TB3 Shunted output from TX XOR combiner | Initialization RB1 to RX PRFG Switch @A Normal Operation TB2 & TB3 to RX PRFG Switch @B |
| XOR Combiner | Initialization TA1 & TC1 Normal Operation Switch @A TA2 & TC2 TA2 = DOI 1 TA2 (Clear Text) & TC2 TA3 & TC3 TA3 = DOI 2 TA3 (Hash Generator Word- typically repeated x8) | Initialization TB1 to TX PRFG Only Normal Operation TB2 & TB3 TB2-Encrypted TA2 Cipher Text to TX PRFG & via Host to RX in TB3-Encrypted TA3 Hash Generator Words = HV/Tag to TX PRFG | Initialization RA1 & RC1 Switch @A Normal Operation Switch @B TB2 & RC2 Encrypted DOI 1 = TB2-Cipher Text from TX XOR combiner & RC2 TB3 & RC3 Encrypted DOI 2- HV/Tag Words from | Initialization RB1 = TB1 to RX PRFG Only Normal Operation TA2 & TA3 TA2 - DOI 1 Clear Text Output to Host only TA3-DOI 2 Hash Generator Word to Host &/or to HV/Tag Authenticator |

| In TX what's input? | In TX what's output? | In RX what's input? | In RX what's output? |
| --- | --- | --- | --- |
| & TC3 | & via Host to RX in | TX XOR combiner typically repeated x 8 & TC3 | |

FIG. 10 is a table of inputs and outputs of the pseudo-random function, switching function and XOR combiner components of each of a TX device and a corresponding RX device, both constructed and operative in accordance with certain embodiments of the present invention.

FIG. 11 is a prior art "825" configuration for generating long words. An arbitrarily large number of orthogonal dual track feedback devices with chained feedbacks afford a method for accelerated output without raising energy per processed bit.

It is appreciated that terminology such as "mandatory", "required", "need" and "must" refer to implementation choices made within the context of a particular implementation or application described herewithin for clarity and are not intended to be limiting since in an alternative implantation, the same elements might be defined as not mandatory and not required or might even be eliminated altogether.

It is appreciated that software components of the present invention including programs and data may, if desired, be implemented in ROM (read only memory) form including CD-ROMs, EPROMs and EEPROMs, or may be stored in any other suitable computer-readable medium such as but not limited to disks of various kinds, cards of various kinds and RAMs. Components described herein as software may, alternatively, be implemented wholly or partly in hardware, if desired, using conventional techniques. Conversely, components described herein as hardware may, alternatively, be implemented wholly or partly in software, if desired, using conventional techniques.

Included in the scope of the present invention, inter alia, are electromagnetic signals carrying computer-readable instructions for performing any or all of the steps of any of the methods shown and described herein, in any suitable order; machine-readable instructions for performing any or all of the steps of any of the methods shown and described herein, in any suitable order; program storage devices readable by machine, tangibly embodying a program of instructions executable by the machine to perform any or all of the steps of any of the methods shown and described herein, in any suitable order; a computer program product comprising a computer useable medium having computer readable program code, such as executable code, having embodied therein, and/or including computer readable program code for performing, any or all of the steps of any of the methods shown and described herein, in any suitable order; any technical effects brought about by any or all of the steps of any of the methods shown and described herein, when performed in any suitable order; any suitable apparatus or device or combination of such, programmed to perform, alone or in combination, any or all of the steps of any of the methods shown and described herein, in any suitable order; electronic devices each including a processor and a cooperating input device and/or output device and operative to perform in software any steps shown and described herein; information storage devices or physical records, such as disks or hard drives, causing a computer or other device to be configured so as to carry out any or all of the steps of any of the methods shown and described herein, in any suitable order; a program pre-stored e.g. in memory or on an information network such as the Internet, before or after being downloaded, which embodies any or all of the steps of any of the methods shown and described herein, in any suitable order, and the method of uploading or downloading such, and a system including server/s and/or clients for using such; and hardware which performs any or all of the steps of any of the methods shown and described herein, in any suitable order, either alone or in conjunction with software.

Any computations or other forms of analysis described herein may be performed by a suitable computerized method. Any step described herein may be computer-implemented. The invention shown and described herein may include (a) using a computerized method to identify a solution to any of the problems or for any of the objectives described herein, the solution optionally include at least one of a decision, an action, a product, a service or any other information described herein that impacts, in a positive manner, a problem or objectives described herein; and (b) outputting the solution.

Features of the present invention which are described in the context of separate embodiments may also be provided in combination in a single embodiment. Conversely, features of the invention, including method steps, which are described for brevity in the context of a single embodiment or in a certain order may be provided separately or in any suitable subcombination or in a different order. "e.g." is used herein in the sense of a specific example which is not intended to be limiting. Devices, apparatus or systems shown coupled in any of the drawings may in fact be integrated into a single platform in certain embodiments or may be coupled via any appropriate wired or wireless coupling such as but not limited to optical fiber, Ethernet, Wireless LAN, Home PNA, power line communication, cell phone, PDA, Blackberry GPRS, Satellite including GPS, or other mobile delivery. It is appreciated that in the description and drawings shown and described herein, functionalities described or illustrated as systems and sub-units thereof can also be provided as methods and steps therewithin, and functionalities described or illustrated as methods and steps therewithin can also be provided as systems and sub-units thereof. The scale used to illustrate various elements in the drawings is merely exemplary and/or appropriate for clarity of presentation and is not intended to be limiting. A computer program product, comprising a computer usable medium having a computer readable program code embodied therein, said computer readable program code adapted to be executed to implement any of the methods shown and described herein.

The invention claimed is:

1. A data integrity system including:
   a transmitter, having a TX pseudorandom function generator, a TX switching function having a transmitting option and a TX combiner;
   the TX combiner being operative to receive, from a Host, an initialization data entity including at least one word, TA1, in an initialization phase to receive, during normal operation, two data entities of interest, DOI 1=TA2 and DOI 2=TA3 each including at least one data word of interest, TA2 and TA3 respectively; to receive a first data entity including at least one word TC1 comprising a randomized data entry, from the TX pseudorandom function generator, to generate a first XOR sum, TA1⊕TC1=TB1 of said initialization data entity's word TA1 and said at least one randomized data entity TC1, in at least one iteration of an initialization phase; and, during normal operation, to generate and to output a second XOR sum TA2⊕TC2=TB2, and a third XOR sum TA3⊕TC3=TB3, wherein TB2 and TB3 are randomized data entities, wherein said words TA1, TA2 and TA3 are operative to initialize said data integrity system including enabling said data integrity system to encrypt said TA2 word and to generate an identifying hash value output using said TA3 word.

2. A system according to claim 1 and also comprising a receiver, including an RX pseudorandom function generator which is functionally equivalent to said TX pseudorandom function generator, an RX switching function having both a transmitting option and a receiving option and air RX combiner.

3. A system according to claim 2 wherein the RX switching function is operative to receive, from a Host, a data entity RA1 shared with the transmitter such that RA1=TA1 and wherein said data entity RA1 is XOR summed to at least one word data entity RC11 which is output from the RX pseudorandom function generator; and to route an output, RB1=RC1⊕RA1, of said combiner to said RX pseudorandom function generator during at least one iteration of the initialization phase.

4. A system according to claim 3 and wherein, in a second, normal operation, phase said RX switching function is operative to receive an output of the TX combiner including encoded data of interest TX XOR sums TB2=TC2⊕TA2 and TB3=TC3⊕TA3 and to route RX inputs TB1 and TB2 to said RX pseudorandom function generator.

5. A system according to claim 4 wherein TA2 comprises a DOI1 file including clear text and wherein said DOI1 File comprises at least one unpredictable word data entity including TC2=ƒ1 (TB1) from the TX pseudorandom function generator.

6. A system according to claim 4 wherein TA3 comprises a DOI2 file including a Hash Generating Word repeated if data is more than 1 word in length, and wherein said DOI2 File comprises at least one unpredictable word data entity including TC3=ƒ2(TB2) from the TX pseudorandom function generator.

7. A system according to claim 3 wherein the RX combiner is operative during the initialization phase to receive said initialization data entity, RA1=TA1, in at least one iteration of said initialization iteration phase.

8. A system according to claim 3 wherein the RX combiner is operative during normal operation to receive the at least one word encoded data entities TB2 and TB3, from the TX XOR combiner output.

9. A system according to claim 8 wherein said shared first input data, RA1=TA1, is XOR summed to RC1=ƒ1(RB1) from said RX pseudorandom function generator and is not output to a Host Sampler.

10. A system according to claim 3 wherein the RX combiner is operative during normal operation to generate XOR sums of said two TX data outputs TB2 and TB3 with two RX unpredictable data entities from RX pseudorandom function generator RC2 and RC3 to facilitate reconstruction of data of interest.

11. A system according to claim 10 wherein said data of interest includes (TA2⊕((RC2=TC2)=TB3))⊕TB3=TA2=DOI1= reconstructed clear text and (TA3⊕((RC3=TC3)=TB3))⊕TB3=TA3=DOI 2 the Hash Generation Word repeated at least once, in order to indicate the validity of DOI 1 because (x⊕x=0 and x⊕0=x).

12. A system according to claim 3 wherein, when in normal operation, the RX pseudorandom function generator is operative to receive said TB2 data and TB3 data directly via said RX switching function with the purpose of generating at least two unpredictable identical data entities, RC2=TC2 and RC3=TC3 and in order to continue maintenance of identical RX pseudorandom function generator and TX pseudorandom function generator binary state variables.

13. A system according to claim 12 wherein said TB2 data and TB3 data are received simultaneously.

14. A system according to claim 1 wherein said words TA1, TA2 and TA3 are operative to initialize said data integrity system including enabling said data integrity system to simultaneously encrypt said TA2 word and generate an identifying hash value output using said TA3 word.

15. A system according to claim 1 and also including a population of data integrity systems each having a TA3 word and wherein each individual data integrity system's TA3 word is unique to said individual data integrity system.

16. A system according to claim 1 wherein said second XOR sum includes an encoding of said data entities of interest TA2 and TA3 and two unpredictable data entities each comprising at least one data word TC2 provided by the TX pseudorandom function generator.

17. A system according to claim 1 wherein said third XOR sum includes an encoding of said data entities of interest TA2 and TA3 and two unpredictable data entities each comprising at least one data word TC3 provided by the TX pseudorandom function generator.

18. A system according to claim 1 wherein said TX switching function is operative to route said first, second and third XOR sums TB1, TB2 and TB3 to serve as inputs to said TX pseudorandom function generator.

19. A system according to claim 1 wherein the TX pseudorandom function generator is operative to receive the first, second and third XOR sums TB1, TB2 and TB3 from the TX combiner, to generate the randomized data entities TC1, TC2 and TC3 therefrom and to generate said randomized data entities to the TX combiner.

20. A system according to claim 19 wherein the randomized data entries TC1, TB2 and TC3 are functions f0, f1 and f2 respectively of the XOR sums TB1, TB2 and TB3 respectively.

21. A system according to claim 20 and wherein said functions f0, f1 and f2 each comprise an intractable randomizing function of at least one of the pseudorandom function generators operative to be affected by at least one of said XOR sums.

22. A data integrity method including:
providing a transmitter, having a TX pseudorandom function generator, a TX switching function having a transmitting option and a TX combiner;
using the TX combiner to receive, from a Host, an initialization data entity including at least one word, TA1, in an initialization phase, to receive, during normal operation, two data entities of interest, DOI 1=TA2 and DOI 2=TA3, each including at least one data word of interest, TA2 and TA3 respectively; to receive a first data entity including at least one word TC1 comprising a randomized data entry, from the TX pseudorandom function generator, to generate a first XOR sum, TA1⊕TC1=TB1, of said initialization data entity's word TA1 and said at least one randomized data entity TC1, in at least one iteration of an initialization phase; and, during normal operation, to generate and to output a second XOR sum, $TA2 \oplus TC2 = TB2$, and a third XOR sum $TA3 \oplus TC3 = TB3$, wherein TB2 and TB3 are randomized data entities, wherein said words TA1, TA2 and TA3 are operative to initialize said data integrity system including enabling said data integrity system to encrypt said TA2 word and to generate an identifying hash value output using said TA3 word.

23. A randomness enhancing method operative to enhance randomness of a pseudo random function computation system including a pseudo random function generator, the method comprising:

using at least one word length concatenation of at least two relatively prime length maximum length linear feedback shift register data words to output a unique pseudo random word count sequence; and combining the random word count sequence to at least one data word which is input to at least one pseudo random function computation's data word input in order to add pseudo randomness to the pseudo random function generator.

* * * * *